(12) United States Patent
Som

(10) Patent No.: US 8,612,147 B2
(45) Date of Patent: Dec. 17, 2013

(54) SYSTEM AND METHOD FOR SIMPLIFIED REPRESENTATION OF GEOGRAPHIC ADDRESSES

(76) Inventor: Anup Som, Saratoga, CA (US)

( * ) Notice: Subject to any disclaimer, the term of this patent is extended or adjusted under 35 U.S.C. 154(b) by 0 days.

(21) Appl. No.: 13/543,362

(22) Filed: Jul. 6, 2012

(65) Prior Publication Data

US 2013/0013202 A1    Jan. 10, 2013

Related U.S. Application Data

(60) Provisional application No. 61/505,527, filed on Jul. 7, 2011.

(51) Int. Cl.
G01C 21/00    (2006.01)

(52) U.S. Cl.
USPC ........... 701/520; 701/409; 701/468; 701/532; 703/2; 340/995.14

(58) Field of Classification Search
USPC .............. 701/408, 409, 468, 520, 532; 703/2; 340/988–996
See application file for complete search history.

(56) References Cited

U.S. PATENT DOCUMENTS

| | | | |
|---|---|---|---|
| 6,081,229 A * | 6/2000 | Soliman et al. | 342/357.42 |
| 6,393,149 B2 * | 5/2002 | Friederich et al. | 382/173 |
| 7,302,343 B2 | 11/2007 | Beatty | |
| 7,903,005 B2 | 3/2011 | Ueda | |
| 2002/0002053 A1 * | 1/2002 | Nam et al. | 455/456 |
| 2012/0254432 A1 * | 10/2012 | Roseborough et al. | 709/226 |

OTHER PUBLICATIONS

Smith, William O, Hutchinson, Kevin P, "Glocode", accessed from http://www.glocode.com on Jul. 6, 2012.

* cited by examiner

*Primary Examiner* — Russell Frejd
(74) *Attorney, Agent, or Firm* — Stephen E. Zweig

(57) ABSTRACT

Computerized methods and system of shortening representations of geographical coordinates (Latitude, Longitude) by replacing the leading significant latitude and longitude digits in a given locality with an optional and often user friendly context hint. The locality context can be indicated either explicitly by a human factors appropriate name, or implicitly by the center of a map or current location of the client computerized device. The invention also discloses a reverse method to recover these eliminated digits by using the approximate center of locality and proximity to provide the missing context information.

19 Claims, 17 Drawing Sheets

Figure 2A

| Location: | Parking spot outside<br>18000 Old Winery Rd,<br>Sonoma, CA, USA |
|---|---|
| Coordinates: | 38.297813,-122.425126 |

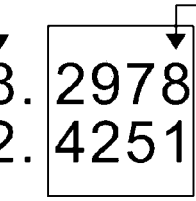

Granularity 1° (100km) — Precision

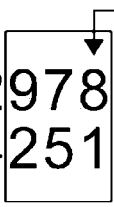

Granularity 0.1° (10km) — Precision

| Local Address (100km): | 2978,4251 | unique in Napa Valley or SFBay |
|---|---|---|
| Local Address (10km): | 978,251 | unique in City of Sonoma |

Remote Addresses:

| San Francisco -N | 2978,4251 | |
|---|---|---|
| SFO -N | 2978,4251 | |
| SFBay | 2978,4251 | (SFBay is a custom Context) |
| Napa | 2978,4251 | |
| Sonoma | 978,251 | |

Alternative Formats:

| SFO -N | BIGH4251 | (1234567890 → ABCDEFGHIZ) |
|---|---|---|
| SFBay | BI42/GH51 | (1km Tile / 10m Target - preferred) |
| Napa | B4I2G5H1 | (Cascading Tiles) |

Note: City names may be qualified - Sonoma, CA, USA

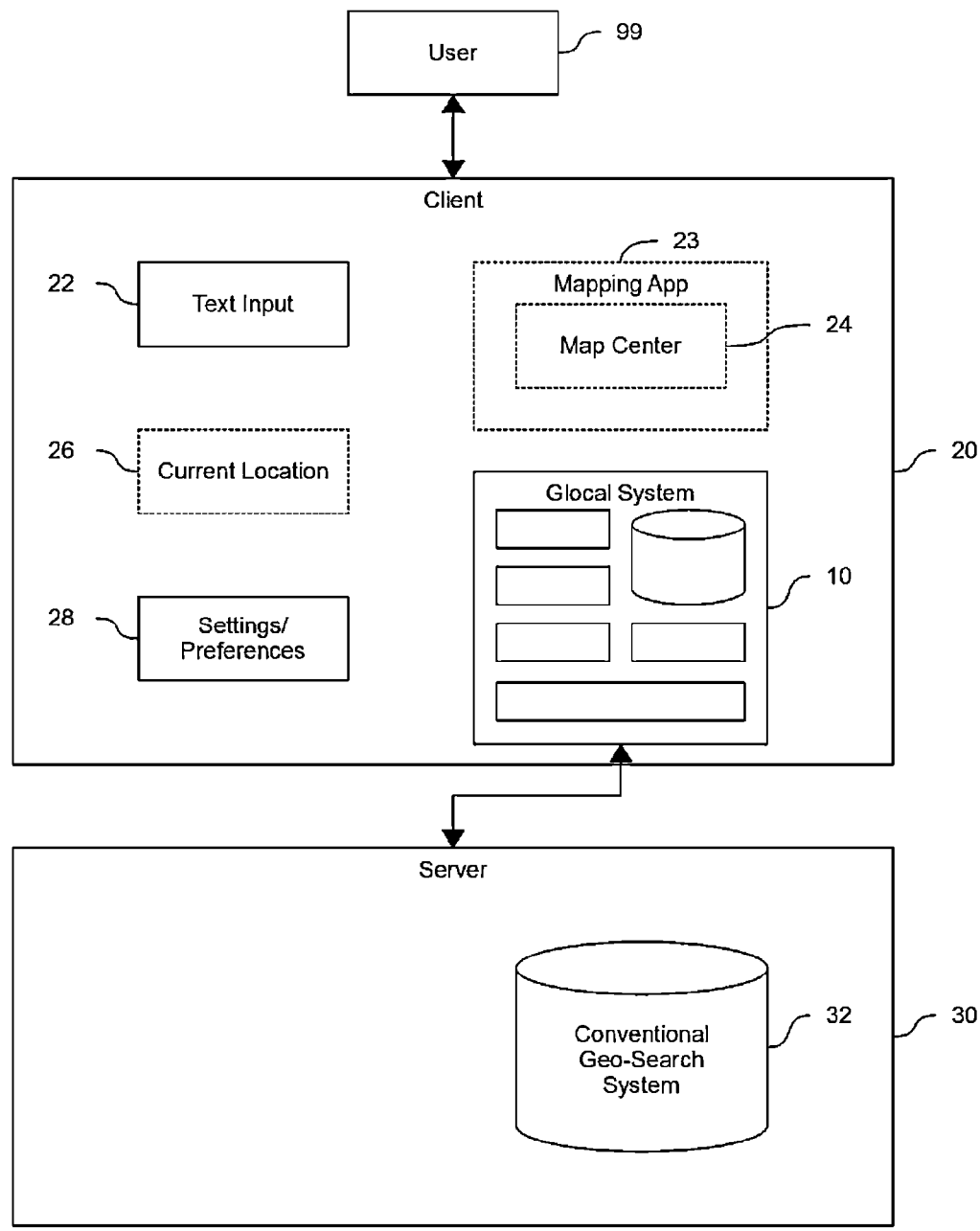

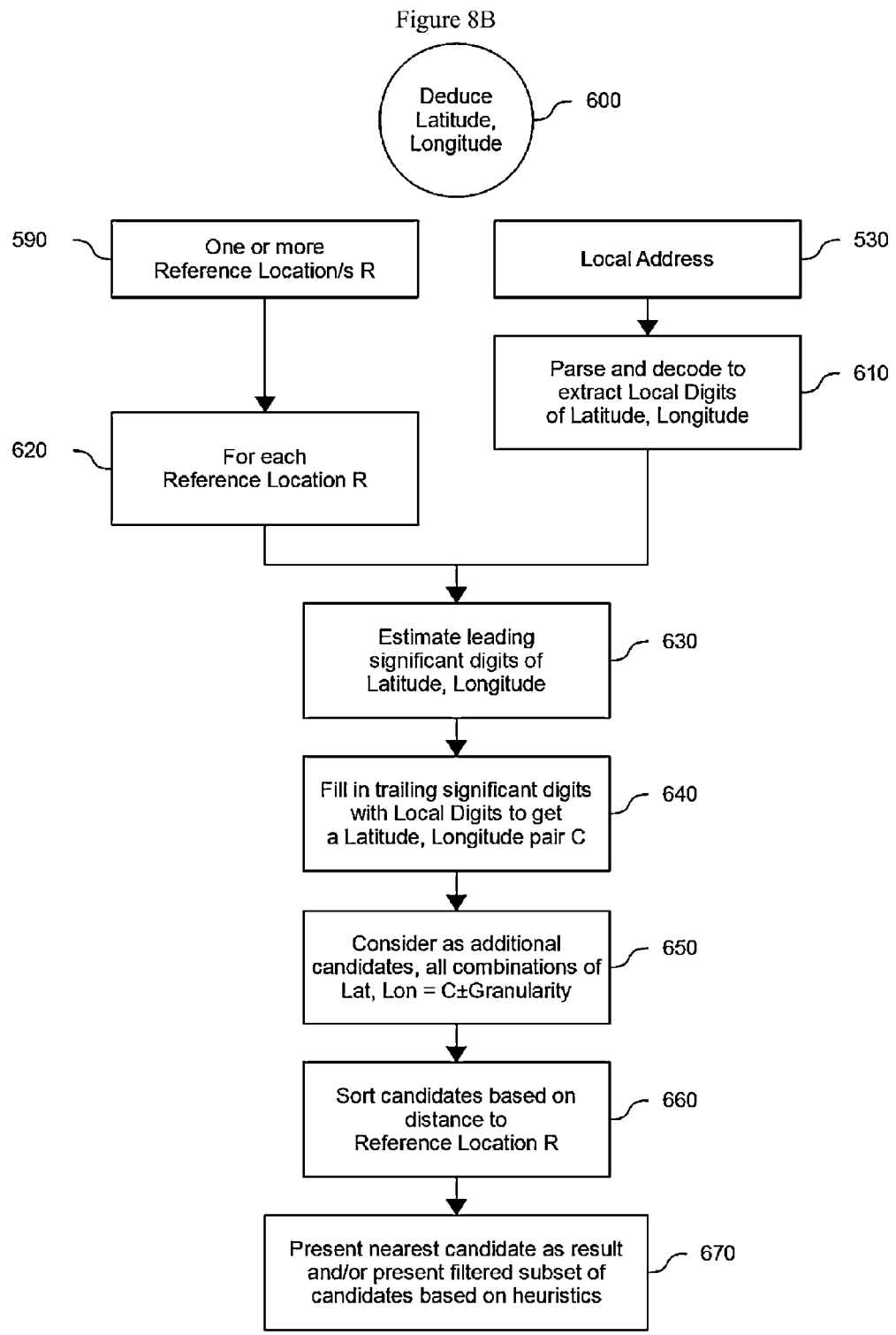

Figure 9A

| Step | Example 1a (Decimal Degrees Format) | Example 1b (DDD MM.MMM Format) |
|---|---|---|
| 100 – Given Target Location | Near 18000 Old Winery Rd, Sonoma, CA | Sleeping Bear Dunes, MI |
| 110 – Latitude, Longitude | Lat= 38.297813° Lon= -122.425126° | Lat= +44° 52.9197' Lon= -86° 2.5375' |
| 120 – Select Precision | .0001° | .001' |
| 130 – Round off to precision | Lat= 38.2978° Lon= -122.4251° | Lat= +44° 52.920' Lon= -86° 2.537' |
| 140 – Select Context Granularity | 1° (approx 100km) | 10' (approx 10miles) |
| 150 – Remove leading significant digits | Lat: 2978 Lon: 4251 | Lat: 2.920 Lon: 2.537 |
| 160 – Local Address Digits | 2978,4251 | 2.920,2.537 |
| 170 – Num,Num format | 2978,4251 | 2.920,2.537 |
| 180 – Alpha Latitude format | BIGH4251 | B.IBZ2.537 |
| 185 – Interleaved format | BI42/GH51 | B2.IBZ537 |
| 190 – Some Other formats | 29784251 24927581 (Interleaved) 4251 2978 (Lon Lat) B4I2G5H1 (Encoded, Interleaved) 2978 1524 (Reverse/Mixed) | 29202537 2537 2920 (Lon Lat) B2.IB53/Z7 |
| 210 – Reference Location | San Francisco, CA 37.62,-122.38 | Detroit, MI 42.33,-83.04 |
| 220 – Offsets | 0.6778,-0.0451 | 2.552,-3.002 |
| 230 – Scale Offsets by 2/Granularity | 1.3556,-0.0902 | 5.104,-6.004 |
| 240 – Round off and format Scaled Offsets | 1,0 → N | 5,-6 → 5N6W |
| 250 – Additional Reference Locations (with Scaled Offsets) | SFO -N Napa, CA [no offsets] Sonoma, CA [no offsets] | Traverse City, MI -W Glen Haven, MI [no offsets] |
| 260 – Sort Reference Locations | 1) Sonoma 2) Napa 3) San Francisco 4) SFO | 1) Glen Haven 2) Traverse City 3) Detroit |
| 310 – Context in Repository | SFBay | |
| 380 – Context Hints | Sonoma / Napa / SFBay / San Francisco -N / SFO -N | Glen Haven / Traverse City -W / Detroit -5N6W |
| Some Glocal Addresses | Sonoma 2978,4251 Napa BIGH4251 SFBay BI42/GH51 San Francisco -N BI42/GH51 SFO -N B4I2/GH51 | Glen Haven, MI 2.920,2.537 Traverse City -W 2920,2537 Detroit -5N6W B2.IBZ537 |

Figure 9B

| Example | Latitude, Longitude | Reference Location | Glocal Address |
|---|---|---|---|
| 310 Washington St, Boston, MA 02108 | 42.3570, -71.0587 | Boston, MA | Boston CE05/GZ87 |
| 310 Washington St, Brighton, MA 02135 (in Boston area) | 42.3489, -71.1515 | Boston, MA | Boston CD15/HI15 |
| 310 Washington St, Dorchester, MA 02121 (in Boston area) | 42.3003, -71.0746 | Boston, MA | Boston CZ07/ZC46 |
| The National Air and Space Museum, NATIONAL MALL BUILDING (Independence Ave Entrance) | 38.8878, -77.0199 | Washington, DC | DC HH01/GH99 |
| The National Air and Space Museum NATIONAL MALL BUILDING (Mall Entrance) | 38.8886, -77.0199 | Washington, DC | DC HH01/HF99 |
| The National Air and Space Museum Steven F. Udvar-Hazy Center | 38.9114, -77.4432 | Washington, DC | DC IA44/AD32 |
| Hotel California 2431 Ash Street, Palo Alto, CA | 37.4265, -122.1443 | San Francisco Airport | SFO DB14/FE44 |
| Blue Waters Kayaking 19225 Hwy 1, Marshall, CA | 38.1527, -122.8894 | San Francisco Airport Marshall, CA | SFO -NW AE88/BG94 Marshall, CA 527,894 |
| Collection de l'Art Brut Avenue Bergières 11, 1004 Lausanne, Switzerland | 46.5275, 6.6247 | Lausanne, Switzerland | Lausanne EB62/GE47 |
| Plot 81, Tsukudu Road, Gaborone, Botswana | -24.6929, 25.8843 | Gaborone, Botswana | Gaborone F8/IBI843 |
| Christ the Redeemer | -22.9519, -43.2105 | Rio de Janeiro, Brazil | Rio de Janeiro IE21/Al05 |
| Alibaba Headquarters 699 Wang Shang Road, Binjiang District, Hangzhou, 310052, China | 30.1888, 120.1909 | Hangzhou, China | Hangzhou AH19/HH09 |
| Ajanta Caves near Aurangabad, India | 20.5524, 75.7004 | Aurangabad, India Mumbai Airport | Aurangabad -NE 5524,7004 BOM -3N6E EE70/BD04 |
| 265 Carlisle Ave, Hebersham NSW 2770, Australia | -33.7503, 150.8199 | Sydney, Australia | Sydney GE81/ZC99 |

Figure 10

| Step | Example 2a<br>(Explicit Context, Granularity=1°) | Example 2b<br>(Implicit Context, Granularity=.1°) |
|---|---|---|
| 500 -- Input Glocal Address | San Francisco -N BI42/GH51 | 328,878 |
| 505 -- Context Hint, Scaled Offsets and Local Address | [San Francisco][N][BI42/GH51] | [][][328,878] |
| 510 -- Context Hint | San Francisco | |
| 520 -- Scaled Offsets | N | |
| 530 -- Local Address | BI42/GH51 | 328,878 |
| 535 -- Context Granularity | 4digits --> 1° | 3digits --> 0.1° |
| 540 -- Context Hint provided | Yes | No |
| 550 -- Found Context in Repository | | |
| 555 -- Context Centroid | | |
| 560 -- Found Context by Conventional Geo-Search | San Francisco, CA, USA | |
| 565 -- Search Result | 37.62,-122.38 | |
| 570 -- Map Center | | 37.326237,-122.038483<br>(in Cupertino, CA) |
| 575 -- Consider proximate Context Respository entries | | |
| 580 -- Offsets | 0.5,0.0 | |
| 590 -- Reference Location | Lat= 37.62 + 0.5 = 38.12<br>Lon= -122.38 + 0.0 = -122.38 | Lat= 37.326237<br>Lon= -122.038483 |
| 610 -- Parse and Decode Local Address | Lat: 2978<br>Lon: 4251 | Lat: 328<br>Lon: 878 |
| 630 -- Estimate leading significant digits | Lat:round( 38.12 - .2978)<br>= 38<br>Lon:round(-122.38 + .4251)<br>= -122 | Lat:round_to_.1( 37.326237-.0328)<br>= 37.3<br>Lon:round_to_.1(-122.038483+.0878)<br>= -122.0 |
| 640 -- Initial candidate | 38.2978,-122.4251 | 37.3328,-122.0878 |
| 650 -- Additional candidates | Lat= 38.2978 ± 1<br>Lon= -122.4251 ± 1 | Lat= 37.3328 ± .1<br>Lon= -122.0878 ± .1 |
| 660 -- Sort candidates based on distance to Reference Location | Top 4:<br>38.2978,-122.4251 (2.6km)<br>38.2978,-121.4251 (8.7km)<br>38.2978,-123.4251 (8.8km)<br>37.2978,-122.4251 (10.9km) | Top 4:<br>37.3328,-122.0878 (4.4km)<br>37.3328,-121.9878 (4.5km)<br>37.2328,-122.0878 (11.3km)<br>37.2328,-121.9878 (11.3km) |
| 670 -- Present Results | 38.2978,-122.4251 | Most likely: 37.3328,-122.0878<br>Also likely: 37.3328,-121.9878 |

SYSTEM AND METHOD FOR SIMPLIFIED REPRESENTATION OF GEOGRAPHIC ADDRESSES

CROSS REFERENCE TO RELATED APPLICATIONS

This application claims the priority benefit of U.S. provisional application 61/505,527 entitled "Methods and system of local address based on removal of leading significant digits from global coordinates", inventor Anup Som, filed Jul. 7, 2011; the contents of which are incorporated herein by reference.

BACKGROUND OF THE INVENTION

1. Field of the Invention

This invention is in the field of computerized location identifiers, digital and non-digital maps, mapping and navigation applications.

2. Description of the Related Art

In developed countries such as the US, most geographic addresses, at least in settled areas, have traditionally been reported by standard postal addresses such as street addresses. In addition to street addresses, alternative mapping schemes, such as city defined local map grid systems have also been used. These latter schemes tend to be both non-standardized and either proprietary or poorly publicized, which tends to limit their use.

In developing countries, such as India, where geographic address methods (e.g. postal addresses) are not standardized, the process of locating specific geographic addresses is often even more complex and difficult.

In recent years, the Global Positioning System (GPS), of GPS satellites and receivers has simplified the task of determining precise latitude and longitude of geographic locations of interest. Additionally, GPS equipped mobile computerized devices such as smartphones, tablet computers and the like have also proliferated, along with wireless communications methods. As a result, direct reporting of latitude and longitude coordinates has now become a viable alternative to reporting geographic addresses.

Although latitude and longitude can be unambiguously expressed, using such methods to find local street addresses can be inconvenient and is not at all "user friendly". Particularly when mobile computerized devices are used, users often find the process of entering in lengthy street addresses and/or long latitude and longitude coordinates to be both complex and error prone. This problem tends to severely hinder the usability of prior art computerized mapping and GPS systems.

Prior art in this field includes Natural Area Code or NAC (www.nacgeo.com), which employs base 30 alpha numeric encoding of latitude and longitude to generate global addresses which are shorter than their decimal degree equivalents for equivalent precision. NAC is similar to Beatty, U.S. Pat. No. 7,302,343, assigned to Microsoft Corporation, who taught a method of compact text encoding of latitude and longitude coordinates.

Other work includes the work of Ueda, U.S. Pat. No. 7,903,005, who taught a method of transforming geographic coordinates.

Prior art also includes www.glocode.com which uses an encoding scheme overridden with customized prefixes in certain metro areas.

All these methods suffer from human factors usability issues, however, which render their widespread use, at least for geographic coordinate problems that require human input, rather problematic. Thus improved methods for dealing with geographic coordinate information that are better optimized from a human factors standpoint are needed.

BRIEF SUMMARY OF THE INVENTION

Nomenclature:

The general process of determining geographic coordinates (e.g. latitude and longitude) from other data such as street addresses, postal codes, and the like is called geocoding. The reverse process, finding street addresses and the like from geographic coordinates, is called reverse geocoding. Geocoding software, designed to implement either geocoding or reverse geocoding methods on various types of microprocessor equipped computerized devices, is often referred to as a "geocoder".

The invention's methods and coordinate output results will often be described in the alternative herein as "Glocal" methods and coordinates. The term "Glocal" is a bit of a play on the words "Global" and "Local", and is occasionally used because it helps to express a purpose of the invention, which is to generate Local addresses based on Global coordinates.

The invention's methods are based, in part, on the removal of the leading significant digits and sign from geo-coordinate (latitude and longitude) information and replacing this data with a "context" reference, here often designated as simply "context" or "context hint".

The invention's implementation of "context" is in turn primarily based on a reference location. This reference location can be either implicit (e.g. a center or focus of an interactive digital map, or the user's current location), or it can be explicit. Typically, explicit context data would be a text based location "hint" that is easily searchable by conventional means. Examples of explicit context data include city names (e.g. 'San Francisco' or 'Delhi'), Airport codes (e.g. SFO, DEL) and the like. In some embodiments, optional custom context can also be selected from a database/repository of, for example, non-rectangular, asymmetric polygons.

Recovering the removed leading significant latitude and longitude digits and sign: To interpret the invention's "Glocal" coordinates, the removed digits and sign can be recovered from the context information (context hint) by using either a nearest to reference location method (often the default method) or alternatively a custom asymmetric proximity method.

By using the invention's context methods, the local address data can be made of minimal length because it will generally be stripped of unnecessary (i.e. redundant) information. To further improve robustness and usability, the context definition method can be flexible, and generally multiple alternative contexts can be used without losing accuracy.

In some embodiments, the invention may make use of latitude, and longitude coordinates in decimal degrees format, and may additionally make use of the World Geodetic System standards, such as the WGS 84 standard, to allow for compatibility with various legacy GPS based systems including major online maps.

In some embodiments, the lower significant digits portion of the location data will often have a latitude and longitude granularity in the 0.1° to 4° range, often around 1°. The 1° range is useful and will often be used as a specific example in this disclosure because it covers an area of approximately 100×100 kilometers (at a latitude of approximately 20-40 degrees north or south), and will often report location to a precision of about 0.0001° (e.g. approximately 10 meters), which is generally acceptable for navigation purposes. Other granularity values, such as 3° are also useful, however. 3° granularity, for example, covers an approximate area of about 300×300 kilometers, which is large enough for most metropolitan areas of the world, while still giving reasonable accuracy.

In some embodiments, base 30 encoding may be used to further reduce the number of characters needed to represent the same decimal value.

Thus in some embodiments, the invention may be a computerized system and method of generating an encoded version of at least the lower significant digits of a geographic addresses latitude and longitude values. Here, the method will generally operate by obtaining (e.g. often entering into a computerized device) a geographic address, determining the latitude and longitude of the geographic address, and determining or obtaining a granularity value. The method will then further use a computerized device (e.g. comprising at least one processor, memory, and software) to use the granularity value to truncate the higher significant digits of the latitude and longitude of the geographic address, producing lower significant digits of the latitude and longitude of the geographic address. The method will then encode the lower significant digits of the latitude and longitude of the geographic address according to various techniques to be discussed.

The inventions system and method may optionally also further provide a context hint by: searching a geo-search database on an external server or a context repository for a human recognizable place location with a latitude and longitude with higher significant digits that correspond to the higher significant digits of the truncated higher significant digits of the latitude and longitude of the geographic address; and outputting the human recognizable place location as a context hint.

Additionally, in some embodiments, the invention may further be a computerized system or method of determining the complete latitude and longitude values of a geographic address, based on input data pertaining to the addresses' lower significant digit latitude and longitude values, and at least one context hint pertaining to the addresses' higher significant digit latitude and longitude values. This method will generally comprise obtaining an encoded version of the addresses' lower significant digit latitude and longitude values, and also obtaining or determining a latitude and longitude granularity value. The method will additionally comprise obtaining at least one context hint that is related to the higher significant digit latitude and longitude values of the address, at least within the error limits defined by this granularity value.

The method will then use at least one computerized device (e.g. a device with at least one processor, memory, and software), and the context hint to determine the higher significant digits of the latitude and longitude associated with the context hint. The method will also use the computerized device to parse or decode the encoded lower significant digit latitude and longitude values, thereby producing decoded lower significant digit latitude and longitude values. The method will then combine the decoded lower significant digit latitude and longitude values with the higher significant digit latitude and longitude values associated with the context hint, thereby determining a complete address with both higher significant and lower significant latitude and longitude values.

BRIEF DESCRIPTION OF THE DRAWINGS

FIG. 2A shows an example of how the invention can calculate the address of a single location.

FIG. 3 shows a client-server embodiment of the invention.

FIG. 8B shows additional details of a method of extracting latitude and longitude form the invention's location address.

FIG. 9A shows some examples of addresses as calculated according to the invention's methods.

FIG. 9B shows some additional examples of addresses as calculated according to the invention's methods.

FIG. 10 shows some examples of latitude and longitude extraction from the invention's location address.

DETAILED DESCRIPTION OF THE INVENTION

As will be discussed, the present invention is a computerized system and method that generate short local addresses and enables the human user to pinpoint locations with the accuracy and precision of geographical coordinates (Latitude, Longitude), but in a user friendly manner. As such, it is intended to provide an alternative to local search for businesses, prior art coordinate based addresses, and Geocoding based methods for determining location.

The basic idea is to reduce the long series of digits presently used to express high precision latitude and longitude information down to a combination of a context hint for the digits of high significance, and the remaining digits of low significance trimmed to appropriate precision. One of several context hint choices may be selected, ideally based on non-cryptic references to generally known locations, for the higher significant digits of the geographic coordinates. This enables a relatively short and human manageable string of data, such as two to four symbols for the latitude, and two to four symbols for the longitude, to be used for the lower significant digits of the geographic coordinates. The net result is to produce detailed and accurate geographic location data that is also easy for human users to remember and enter into various computerized devices. Because, for local use, the context may be available by other means such as GPS, this enables users to enter in extremely short length location data information. For non-local use, the context hint itself will give the non-local user an often human readable idea of the gross location of the location of interest. An additional benefit of this approach is that although usually intended for use with GPS equipped computerized devices, the method can also be made compatible with non-computerized and/or non-GPS systems, even including paper and printed maps.

Figure 1A:
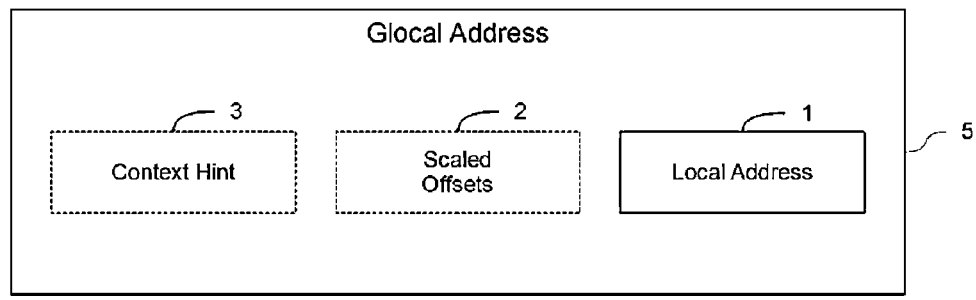
FIG. 1A shows the address components according to the invention.

FIG. 1A shows an overview of the components of the invention's "Glocal" address (5). The invention's address scheme generally comprises a context hint field (3), which may be optional, a scaled offset field (2), which also may be optional, and an obligatory local address field (1).

When used within a locality, the local address field (1) may be all that is needed (i.e. sufficient) for many uses, such as for human users who don't need the full global coordinates. Thus computing devices that are aware of the relevant context, such as with the center or focus of an interactive digital map (FIG. 3(24) to be discussed) or the current location (FIG. 3(26), also to be discussed) may also utilize the local address directly without the need to use additional information.

However for remote use, according to the invention the local address field needs to be associated with a context field to fully resolve the more complete latitude and longitude coordinate values. In general, the conversion is:

Remote Address=Context Hint [+Scaled Offsets]+ Local Address

The context hint field (3) can refer to at least two types of contexts. One is a reference locations (point type) context, or a context repository entry (typically region/polygon type) context. Often, the context hint can be any text likely to be found in a prior art or conventional geo-search system (32) or custom context repository (14) that is representative of a desired context for the Target Location (FIG. 6A (100), to be discussed).

In situations where the target location is too far (e.g. greater than about 0.5* the desired latitude or longitude granularity setting, which is often 1° from a reference location, the scaled offset (2) field may also be applied to the reference location. Such offsets may also be useful because the reference location coordinates can occasionally vary significantly depending on which conventional geo-search system (32) is used to determine the latitude and longitude of the context. The offset field may be scaled such that integer increments are equivalent to 0.5*the desired latitude or longitude granularity setting, which again is often 1°.

Figure 1B:
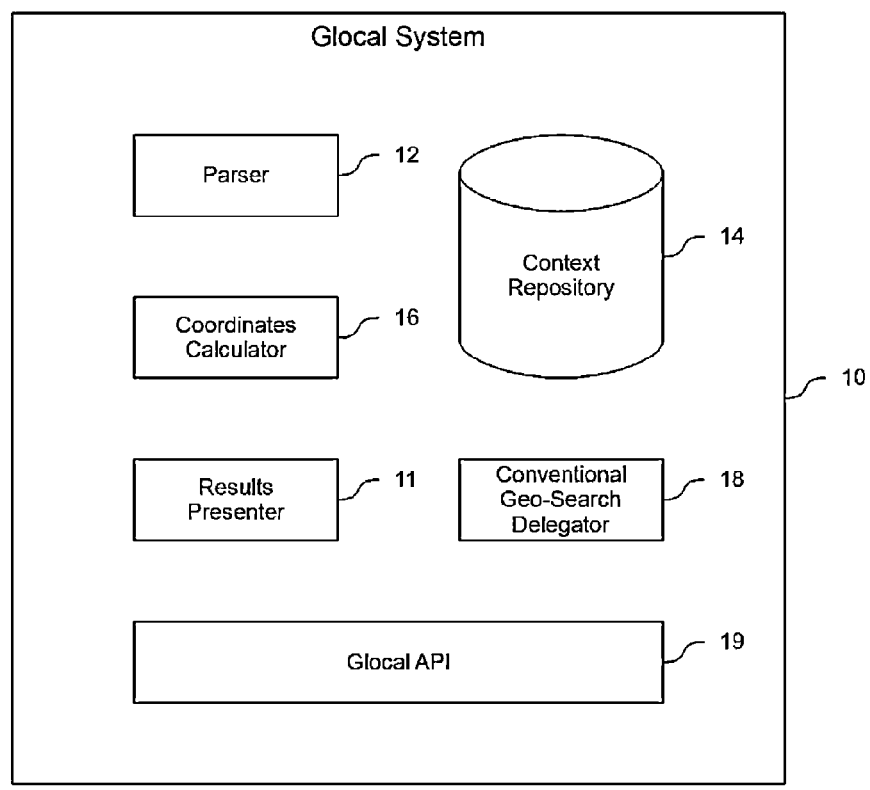
FIG. 1B shows the main components of the computerized implementation of the invention.

Computerized System Suitable for Implementing the Invention's Glocal Methods:

FIG. 1B shows the main elements of a computerized system capable of implementing the invention's Glocal methods (10). In this embodiment, the invention's Glocal system comprises at least one processor, such as a microprocessor (often chosen from the popular x86, ARM, or MIPS family of processor), computer memory (e.g. RAM, Flash, hard drives, and the like), various I/O devices, and software capable of implementing a parser (12), a context repository (14), a coordinates calculator (16), a conventional geo-Search delegator (18), a results presenter (11) and often the various Glocal API (19).

The parser software (12) directs the device's processor to split an input address into the various address fields or parts (1, 2, and 3) as previously described in FIG. 1A above. In some embodiments, the data granularity may be derived from the local address (1).

One or more, optional, context repositories (14) may be used to augment, customize or override entries in conventional geo-search systems (32). Here, for example, a minimal embodiment of an entry can have a Name or Code, and Center Location (the default region of applicability being ±0.5*Granularity neighborhood of Center).

Another alternative minimal embodiment of such an entry can use an asymmetric polygon to customize interpretation of the local address within the polygon region.

The coordinates calculator (16) is a main element of the Glocal system. This software module calculates (and fills in) the missing parts of the global coordinate values in an input local address.

The invention may also use a software module to run conventional geo searches (18) i.e. a conventional geo-search delegator can be used to communicate with one or more conventional geo-search systems (32).

The results presenter (11) may often return a single location result, possibly with additional related information. Alternatively the results presenter may return multiple candidate location results. This can often happen when there is some ambiguity. In this case, multiple results may be sorted using a software implemented heuristic algorithm that, for example, checks if a candidate location is in water, and if so will discard or deweight that option.

The system may also optionally provide a Glocal application programming interface (API) (19). This API can be used by other applications (38) to interact with or utilize the Glocal system on the server (30). Additionally, other client applications may also interact with or utilize the Glocal system via this Glocal API.

Examples of the Invention's "Glocal" Address Methods

FIG. 2A shows different ways in which the invention can express the same location, here (38.297813,−122.425126) in Sonoma, Calif., USA, as alternative Glocal addresses.

By way of reference, this example location is in a parking lot just outside the oldest winery in California (18000 Old Winery Road, Sonoma, Calif.). Many visitors to San Francisco like to visit wineries in the famous Napa valley. The city of Sonoma is nearby, but it is not as well known.

To get to this location, often visitors fly into San Francisco International Airport (airport code SFO) and may need to plan their trips from SFO. According to the invention, various different Glocal Addresses can be created with respect to all these reference locations, and this is shown in FIG. 2A.

According to the invention, both San Francisco and SFO can be used for the context data, but note that San Francisco and SFO are more than 0.5° away from the given target location, and thus require coordinate offsets, here represented by "−N". Note also that Sonoma, being a small city, fits within 0.1° latitude and longitude granularity. It thus provides superior or at least more local context data. As a result, according to the invention, when Sonoma is used as the location context, and because 3 digits for each latitude and longitude are sufficient to unambiguously represent the target location within ±0.05° of Sonoma, then by using Sonoma as the context, the target location coordinates of (38.297813,−122.425126) can be expressed by three latitude and three longitude digits, rather than with the four latitude and four longitude digits as would be required if the more distant SFO or Napa context hint was used.

As an alternative to all numbers, some form of encoding may be used for the Local Address. Encoding is covered in FIG. 6A.

Figure 2B:
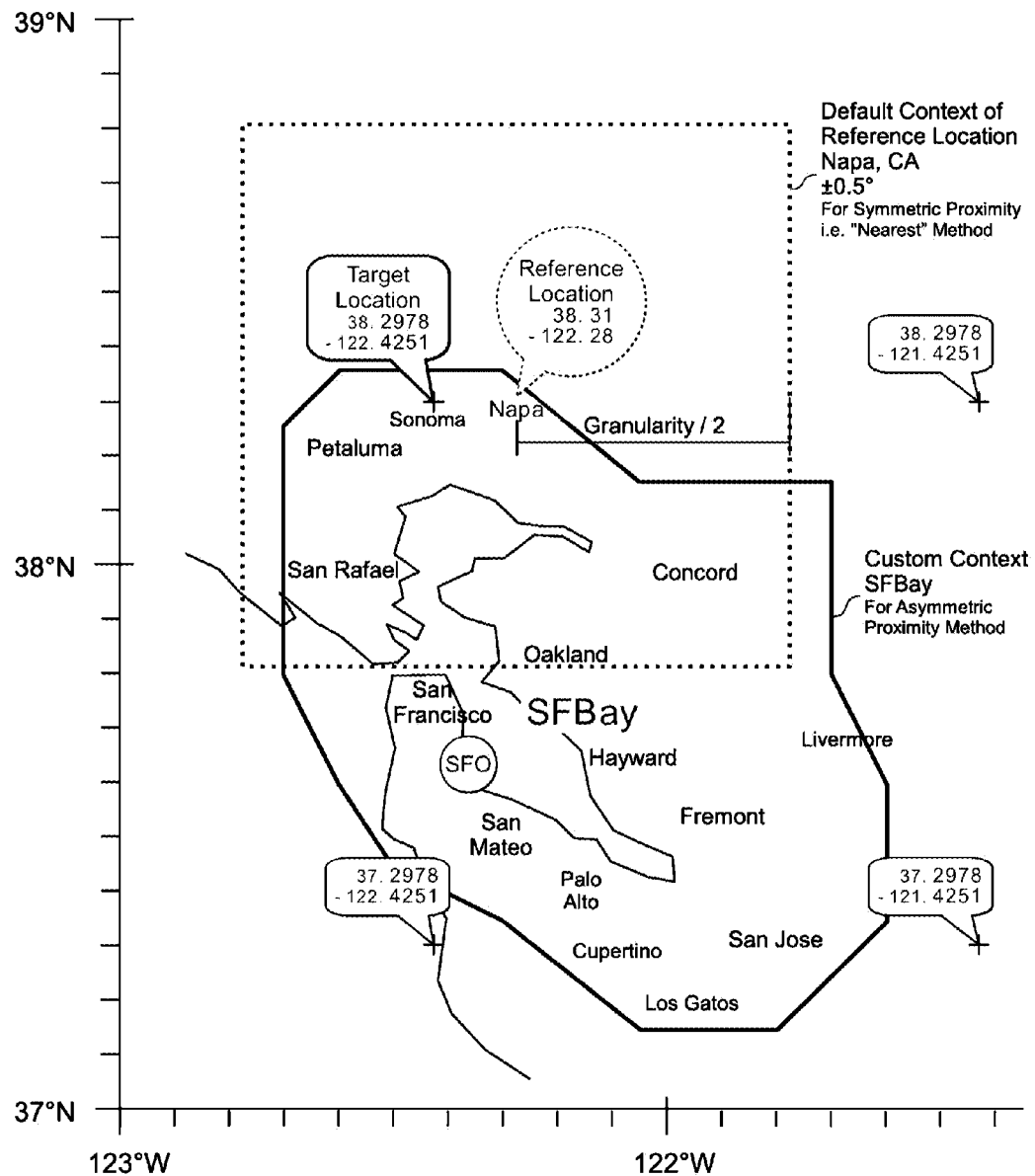
FIG. 2B shows an example of how the invention can use a well known reference location to then define target locations versus this reference.

FIG. 2B shows these contexts (with a Granularity of 1°) on a map. A latitude difference of 1° corresponds to approximately 111 km (70 miles) on the surface of the earth. (Note that a longitude difference of 1° is 111 km at the equator, and this distance decreases and tapers toward the earth's poles). Thus many places, such as all cities in the San Francisco Bay area, can individually fit within 1° granularity in terms of latitude and longitude.

FIG. 2B also shows the default context of Napa, Calif. as the dotted ±0.5° square region around the Napa reference location. This illustrates the invention's the symmetric proximity or "nearest" method By contrast, the solid, non-rectangular custom context San Francisco Bay region (SFBay) illustrates the invention's alternative asymmetric proximity methods. These alternative methods allow encompassing much of the San Francisco Bay area into a single context, without changing granularity.

FIG. 2B also shows other nearby locations (candidates) with same local address 2978,4251 as that of the winery target location. However, the winery target location is the only one within both, the default context of Napa, and custom context of SFBay.

System Architecture:

FIG. 3 shows an architecture embodiment of the invention in which a human user (99) interacts with a computerized client device (20) that is Glocal enabled. Such a typical client device may comprise a computerized device with a means (I/O device) to accept text input (22), an optional mapping application (23) from which a center or focus of an interactive digital map (24) can be obtained, an optional means (such as a GPS system) to obtain the current location (26) of the client device, and means (e.g. I/O devices, I/O software, memory) to have settings/preferences (28).

The architecture in FIG. 3 also includes the Glocal system of FIG. 1B (10) within the client. In this embodiment, the conventional geo-search delegator (18) component of the Glocal system may communicate (often through a network such as the internet, and often using a wireless connection) with a server (30) (e.g. internet server) that provides the results of a conventional geo-search System (32). Examples of such a conventional geo-search system include Google Maps, and the like.

Figure 4:
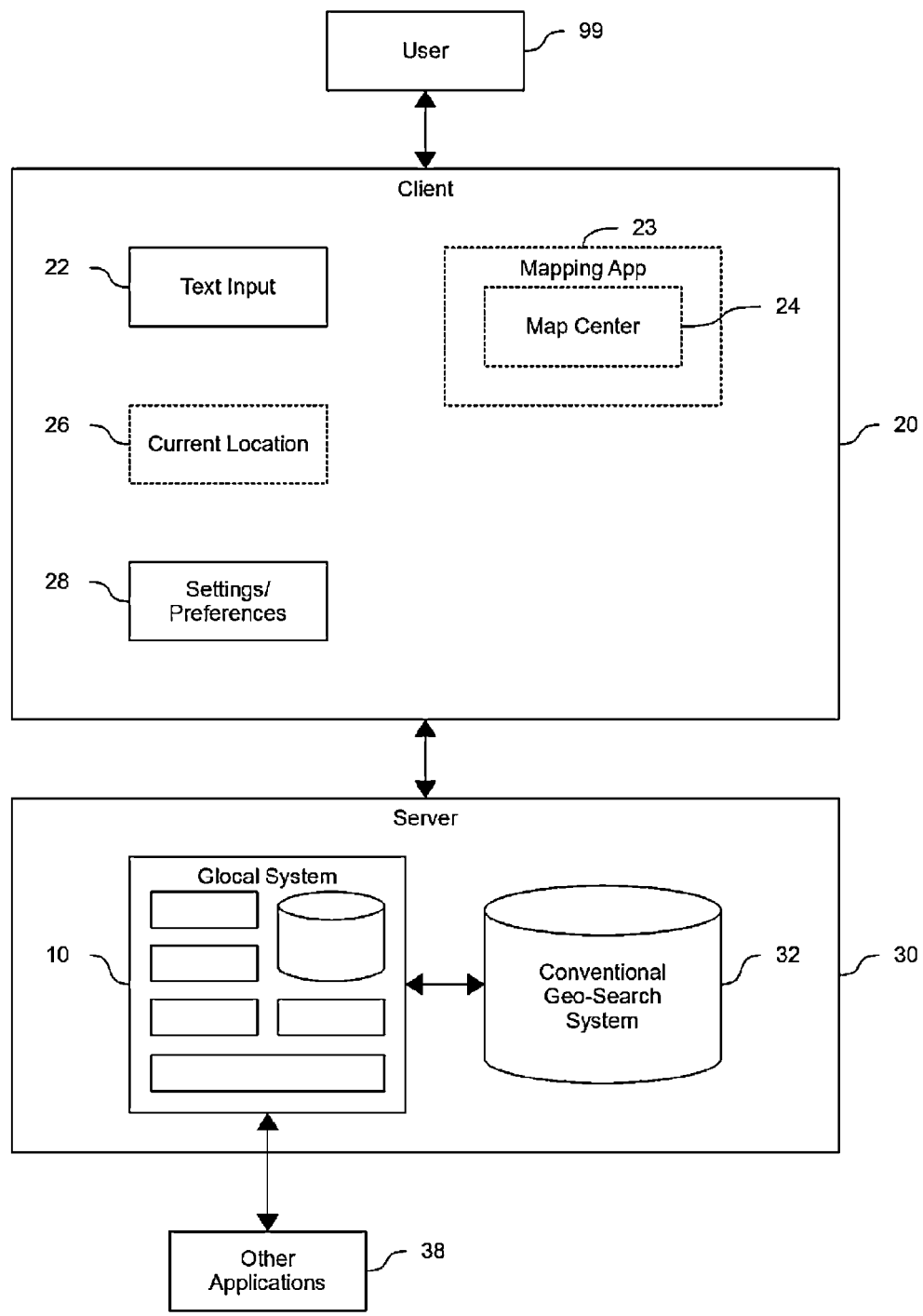
FIG. 4 shows an alternate client-server embodiment of the invention.

FIG. 4 shows another architectural embodiment of the invention, in which the Glocal system (10) resides completely on a server (30) and other applications (38) can use the various Glocal functions on the server side through the previously discussed Glocal API (19).

Other Embodiments and Architectural Variations

In alternative embodiments, parts of the Glocal system(s) may simultaneously operate in one or both of the client (20) and/or server (30) devices. Here, for example, a cached subset of the context repository (14) may operate on the client for quick access and/or offline operation.

Depending on the embodiment, there may be multiple context repositories, one context repository, or even no context repository. An example of multiple context repositories would be a first repository with custom large contexts and a second repository that stored Airport Codes with locations. These multiple context repositories could exist on one server or multiple servers.

Similarly there also may be multiple servers (30) e.g. each performing Glocal functions and/or GeoCoding for different regions of the world.

Client Computerized Devices

Examples of various client computerized devices that can be used by a human user to interact with the invention's Glocal system include personal computers (often through internet browsers), mobile phones, smartphones/tablet computers, and the like (often through native apps or internet browsers). All will generally also have at least one microprocessor, memory, and various input and output devices, such as graphical user interfaces, often with bit-mapped display screen(s), touch screen or mouse input, and optional keyboard input. Some may make use of other input/output schemes, such as audio (e.g. speech) input and output.

Figure 5A:
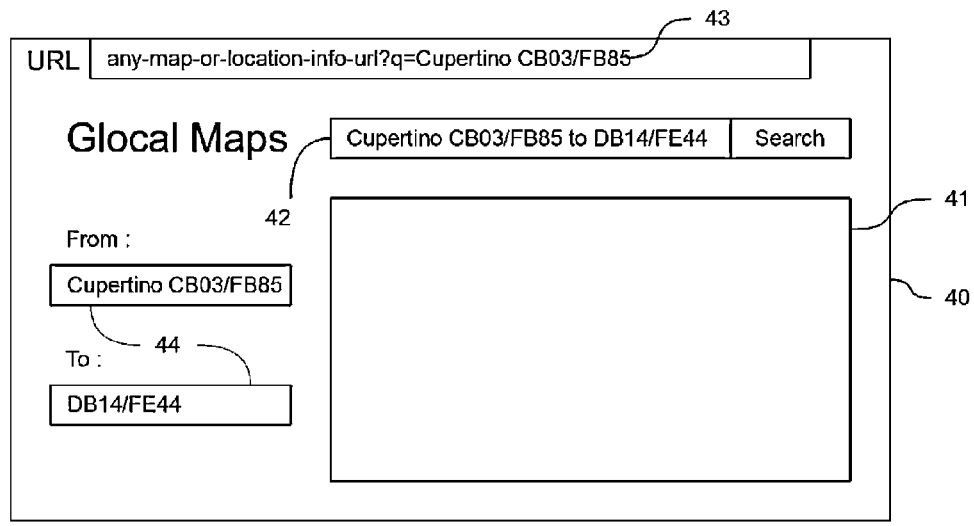
FIG. 5A shows the invention operating within a standard web browser.

FIG. 5A shows an example where the client computerized device is a personal computer browser (40) running a mapping application (41). In this example, the text search field (42) of the mapping application shows two examples of Glocal address intended to get directions from the first Glocal address to the second. Here the browser URL field also shows the Glocal address used in the query string (43).

Figure 5B:
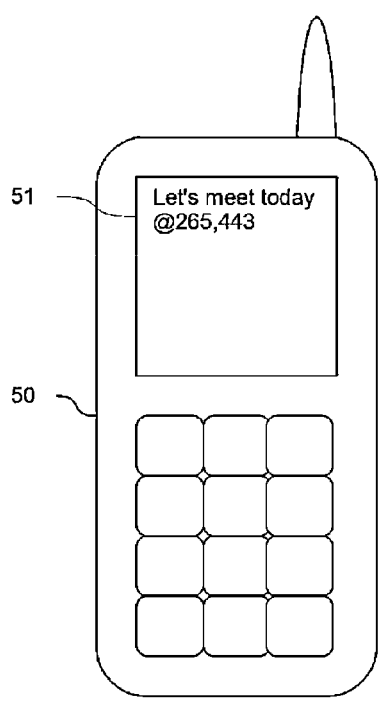
FIG. 5B shows the invention operating on a mobile phone.

FIG. 5B shows an example where the client computerized device is a mobile phone (50) (e.g. a cell phone), here showing a text message in which a Glocal address is used to communicate a location (51).

Figure 5C:
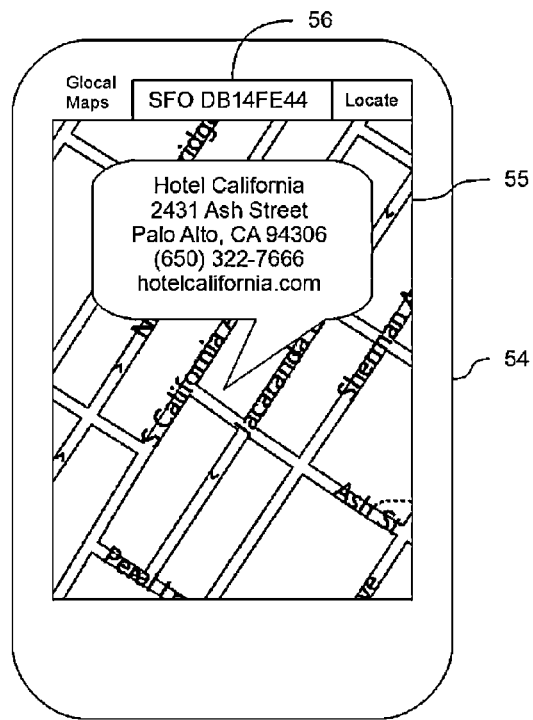
FIG. 5C shows the invention operating on a smart phone.

FIG. 5C shows an example where the client computerized device is a Smart Phone (54), such as an Apple iPhone, Android cellular phone, Windows mobile phone, and the like running a Glocal enabled mapping/navigation Application. The results of a location search input (56) are shown displayed along with a road map (55) of the neighborhood near the location that the system is pointing to.

In general, any computerized device or application that deals with communication or storage of location, location representations, maps, navigation, addresses, contact information and the like can take advantage of the invention's "Glocal" methods.

FURTHER DESCRIPTION AND EXAMPLES

Two Main Processes in the Glocal System Are:
1: Generating a Glocal address (often comprised of a Glocal local address and a Glocal context) and
2: Interpreting a Glocal address (i.e. extracting global coordinates from a Glocal address)

Figure 6A:
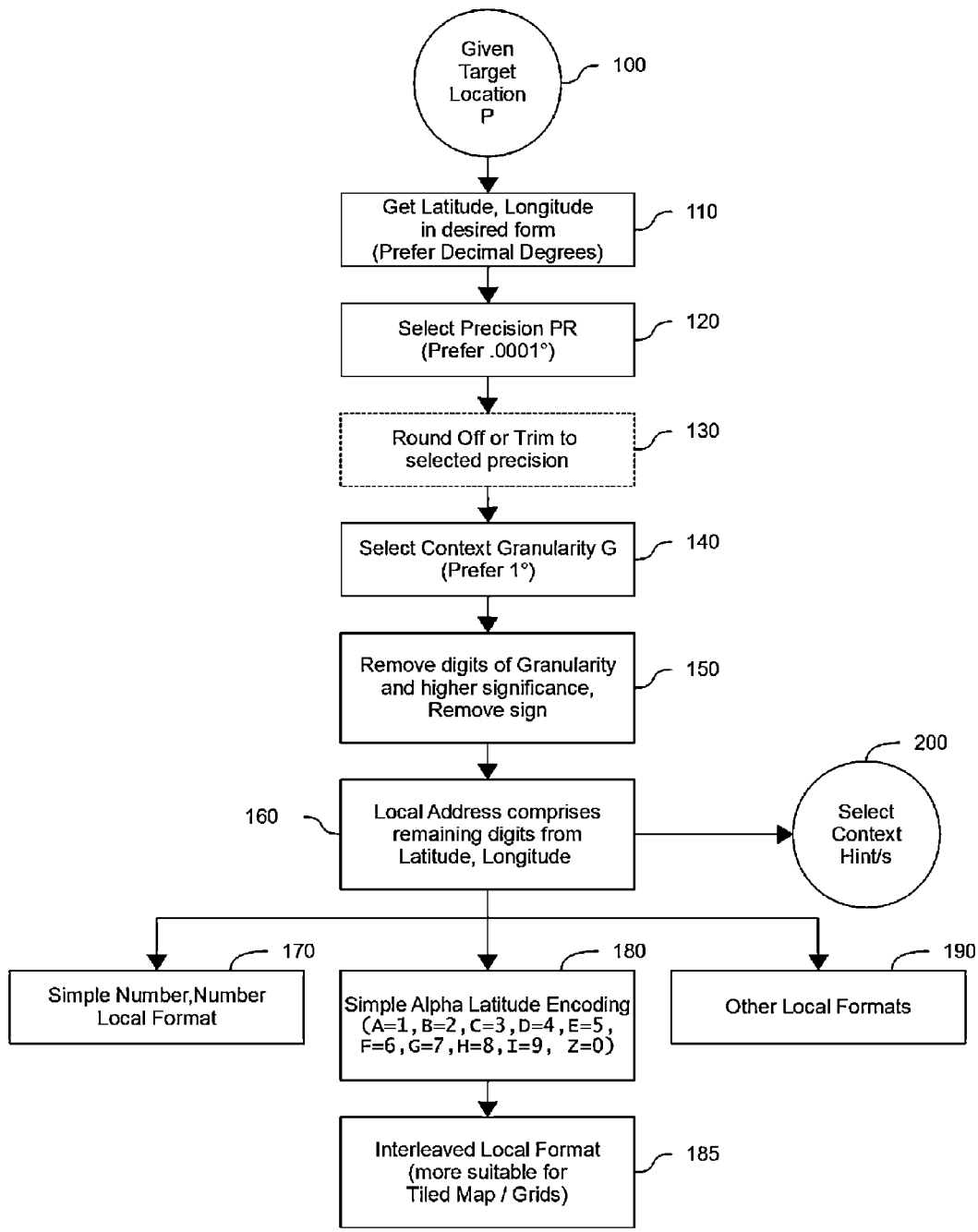
FIG. 6A shows a flow chart of one method of generating local addresses according to the invention.

Invention's Methods of Generating a Glocal Local Address:

FIG. 6A shows a method of generating the local Address FIG. 1A(1) part of a Glocal address for a given a target location (100).

Step 100—Target Location P

Step 110—Select a representation of the target's latitude, longitude coordinate angles. Generally a preferred representation is Decimal Degrees.

Step 120—Select a desired precision for the coordinates. Generally a preferred precision of 0.0001° is often used, which corresponds to approx 10 meters.

Step 130—Optionally round off or trim the latitude, and longitude coordinates to a selected precision, and pad with zeroes if necessary.

Step 140—Select the context Granularity. Often this is a value such as 1°.

Step 150—Remove digits of Granularity and higher significance. Also remove the sign. In rare cases, such when the target is on the equator or prime meridians (e.g. London, UK), the sign can change within a locality. In such cases, the sign can be replaced with a special context hint or offset, such as "–E" for East to resolve this ambiguity Step 160—After the previous steps, what remains is essentially the Glocal local address (FIG. 1A(1)), which can then be formatted for output or storage in several different ways. For remote users, additionally a context hint (FIG. 1A(3)) and Offsets (FIG. 1A(2)) can be used. See FIG. 6B (200).

Alternative Formats for the Glocal Local Address:

Step 170—Simple number type local address format. A simple number format is a pure numbers pair that is optionally separated with a comma e.g. 1234, 5678 or other separation symbol. This number pair may be formatted in many alternative ways, and is often the preferred format.

Step 180—Simple alphanumeric latitude (or longitude) encoding format. One simple encoding that may be applied to one of latitude or longitude is to use alphanumeric characters, such as A=1, B=2, C=3, D=4, E=5, F=6, G=7, H=8, I=9 and Z=0. This format has the advantage that the distinction between latitude and longitude is immediately obvious to human observers (i.e. numeric versus letters) and thus a separator symbol is not needed (e.g. ABCD5678).

Step 185—Interleaved type Glocal local format. Optionally, the alpha numeric local address may be interleaved (e.g. AB56/CD78) to represent progressively reducing tiles (i.e. AB56 representing a 0.01° by 0.01° region and CD78 a 0.0001° by 0.0001° region within it). Such interleaving may be preferred for some map tile labeling applications.

Step 190—Other formats to express Glocal local addresses are also possible. In general, any combination of local address digits can be used, including with or without encoding for latitude and/or longitude, with or without separators, forward or reverse, interleaved or not, with or without additional text/symbols, based on local preferences or not. Here, if the implied granularity, units or precision cannot be determined easily from the input data, the user's previously established preferences (like miles vs. km) can often be used to help disambiguate local addresses.

Alternate Embodiments of Encoding/Format that Can be Used in Step 190:

Decimal Granularity Based Encoding: In the Interleaved Local Format (Step 185), if a user enters AB12, it is not clear whether AB12/ or /AB12 is intended. To avoid ambiguity, additional clues may be introduced by using different latitude encodings for the former and latter parts, such as in Table 1. The new address would then be AB12/QR12 or AB12QR12. Further, this can be extended to two additional orders of magnitude of granularity by not encoding Latitude digits at all. When used with country code as context hint, this scheme can give a fixed width global address that looks like CC 1234. AB12/QR12, where CC is a 2 letter country code such as ISO Country Code.

TABLE 1

Alternative Decimal Granularity Based Encoding Scheme

| Position of Latitude Digit | 1 | 2 | 3 | 4 | 5 | 6 | 7 | 8 | 9 | 0 |
|---|---|---|---|---|---|---|---|---|---|---|
| 10 and 1 | 1 | 2 | 3 | 4 | 5 | 6 | 7 | 8 | 9 | 0 |
| 0.1 and 0.01 | A | B | C | D | E | F | G | H | I | J |
| 0.001 and 0.0001 | Q | R | S | T | U | V | W | X | Y | Z |

This scheme removes ambiguity about granularity when parts of a Glocal address are used without separators. For example, the location of Shanti Guest House at 2-20-2, Nishi Kasai, Edogawa-ku, Tokyo, Japan (with coordinates 35.666569,139.854093) would have a remote Glocal address JP 3539.FF85/VU41 using this scheme. Parts of this Glocal address can be used in different combinations as shown in the Table 2 below:

TABLE 2

Various partial Glocal addresses in decimal granularity based encoding scheme

| Local Address | Granularity | Unique within | Precision |
|---|---|---|---|
| JP 3539.FF85/VU41 | 180°, 360° | World | 0.0001° |
| 3539.FF85/VU41 | 100.00° | Country | 0.0001° |
| FF85/VU41 | 1.00° | Metro Area | 0.0001° |
| VU41 | 0.01° | 1 km | 0.0001° |
| FF85 | 1.00° | Metro Area | 0.0100° |
| 3539 | 100.00° | Country | 1.0000° |

Note that the separators help with readability but granularity can be derived without them.

Although most examples in this disclosure are based on the base 10 numeric system, alternative schemes are also possible. As an example, an alternative Glocal base 30 encoding scheme, such as below can be used to subdivide 1° latitude and longitude measurements into smaller increments in a manner that is similar to a geographic latitude and longitude minute and second approach. Here, base 30 can be mapped onto the standard 1-10 and A-F alphanumeric symbols by a scheme such as shown in the Table 3 below:

TABLE 3

Alternative base-30 Glocal encoding scheme

| 0 | 1 | 2 | 3 | ... | 24 | 25 | 26 | 27 | 28 | 29 |
|---|---|---|---|---|---|---|---|---|---|---|
| 0 | A | B | C | ... | X | Y | Z | 7 | 8 | 9 |

In this alternative scheme, the first character or symbol can represent degree/30; the second character or symbol can represent degree/$30^2$; the third character or symbol can represent Degree/$30^3$; and so on. This scheme is very efficient because with only three symbols, it can represent geographic locations with a precision of 00A=1/27000=3.7e−5°=approximately 4 meters. Thus using base 30 Glocal nomenclature, the geographic location 17' 52.067", 25' 30.367" can be encoded as H8A,LVR (6 characters, 0.000037° precision). By contrast, if more common base 10 decimal encoding is used, this would require two extra symbols, e.g. 2978,4251 (8 characters, 0.0001° precision). Thus base 30 encoded Glocal address parameters can be both more compact than decimal parameters, and also slightly more precise. In situations where compactness is paramount to users, then use of such base 30 methods may be preferable. Other base encoding methods may also be used, although normally base encoding methods between about base 10 and base 128 (inclusive) will be used.

The base 30 encoding of Table 3 can be enhanced by introducing a separator, such as the colon character ':' to indicate granularity. This is useful when the Glocal local address is used partially. Additionally, if granularity is 3 degree, the resulting lowest three levels of precision may correspond approximately to the size of a typical town (3/30=0.1 degree, approx. 10 km), neighborhood (3/$30^2$=0.003 degree, approx. 300 m), and building (3/$30^3$=0.00011 degree, approx. 10 m). For example, "Tokyo ZR:SP9G" represents Shanti Guest House, from above. The first part of the local address "ZR:" represents a town sized region centered at Edogawa and ":SP" approximates a neighborhood centered at Nishikasai. The colon symbol disambiguates which granularity is intended.

Figure 6B:
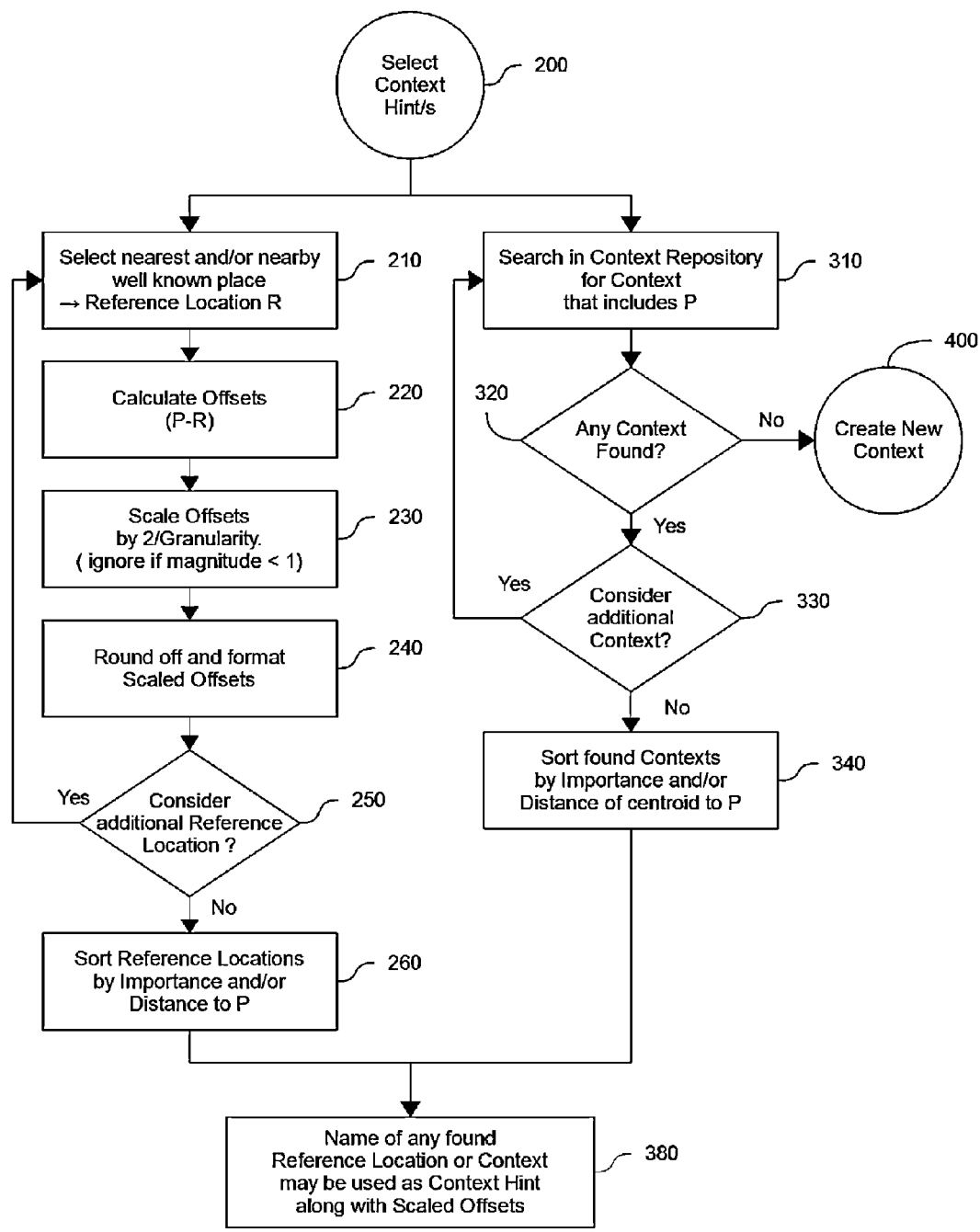
FIG. 6B shows the use of context hints and coordinate offsets to generate local addresses according to the invention.

Method of Selecting Context Hints and Generating Glocal Offset Values or Data:

FIG. 6B shows one of the invention's methods of selecting one or more optional Glocal context hints (FIG. 1A(3)) and generating optional corresponding Glocal scaled offsets (FIG. 1A(2)) if needed.

Step 210—The selection of a reference location often involves selecting the nearest well known place. This can be assisted by using the previously obtained reverse GeoCoding results Step 220—Calculate Glocal offsets (difference between the reference location coordinates and the target location coordinates)

Step 230—Scale each component of the Glocal offsets by 2/Granularity. The resulting components may individually be ignored if they are less than 1 in magnitude (preferably well below 1 e.g. <0.8). Essentially, these offsets are mainly useful when the reference location is not close enough to the target location.

Step 240—Round off and format the scaled offsets. Here, a simple format may be used, such as N for (+1, 0), W for (0,−1) and for larger offsets 3S2E for (−3, +2) may be used. In general, many types of convenient separator symbols, such as dash symbol, may be used as a prefix here.

Step 250—Additional reference locations may also be chosen from other well known places nearby the target location. To allow this type of flexibility, the invention also allows multiple alternative reference locations to be used depending on the characteristics of the Glocal address recipient. For example, in the case where a Glocal address is being calculated for a house address in Cupertino, Calif., and the Glocal recipient is an individual who is not familiar with San Francisco bay area, then a context based on San Francisco or San Francisco International Airport (airport code SFO) may be more appropriate. Alternatively, if the recipient is someone who is more familiar with the San Francisco Bay area, then Cupertino may be more appropriate to use as the reference or context location.

Step 260—Optionally, in case of multiple reference locations are feasible, the system can present the user with a list of these various possible reference location, and even sort these reference locations according to various criteria, such as, importance, distance to the target location (FIG. 6A(100)), convenience, preference, and so on.

6B also shows various methods of selecting context repository entries:

Step 310—the system looks for any available context repository (FIG. 1B(14)) entry that geometrically includes the target location (100).

Step 320—If no suitable context repository entries are found, then the system may create new ones (step 400).

Step 330—Multiple context repository entries are allowed.

Step 340—Optionally, in the case that multiple suitable context repository entries are found, the system can present them in a sorted order based on previously discussed criteria such as importance, distance to the target Location (100), convenience, preference, and so on.

Step 380—The name or text based code representing any of the reference locations (Step 260) or context repository entries (Step 340) may also be used as a context hint (FIG. 1A(3)) along with corresponding formatted Scaled Offsets (FIG. 1A(2))

Figure 7:
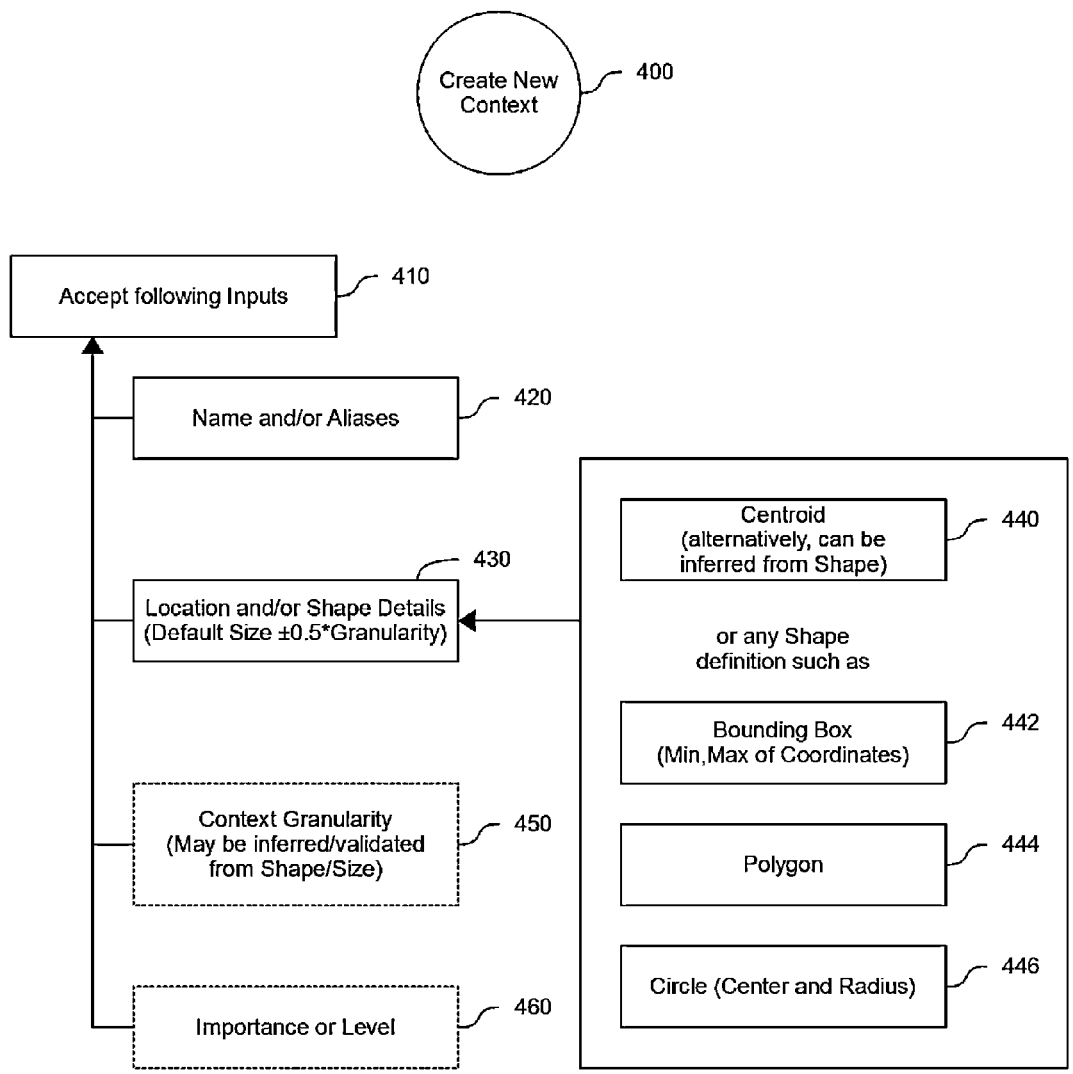
FIG. 7 shows a method of creating a context repository entry.

Methods of Creating a Context Repository Entry:

FIG. 7 shows a method of creating a new context repository entry (400).

Step 410—Accept the following inputs

Input 420—Name, nickname, code and/or aliases. Generally it is best here for the user to enter short, convenient, familiar or memorable text Input 430—Location and/or shape details. In some embodiments, the system may be set to use a default shape such as ±0.5*Granularity around Location. This may comprise a centroid location (440) or alternatively any other type of shape definition such as rectangular bounding box (i.e. min, max of Coordinates (442)). Here the idea is that the polygon should preferably be defined such that the included local addresses inside the polygon are unique (444). Alternatively a circle with a center and radius (446) may be used.

Input 450—Optional context granularity. Here it is often convenient to set the system to use a preferred default value such as 1°. In some cases, however this may also be inferred from the shape definition (430).

Input 460—Optional importance, level or weight. These parameters can be used to sort or determine the preference of an entry in the case where a particular target location is included or found within multiple context repository entries. Alternatively, the granularity parameter itself may be used in some cases, usually with higher Granularity carrying more weight.

Figure 8A:
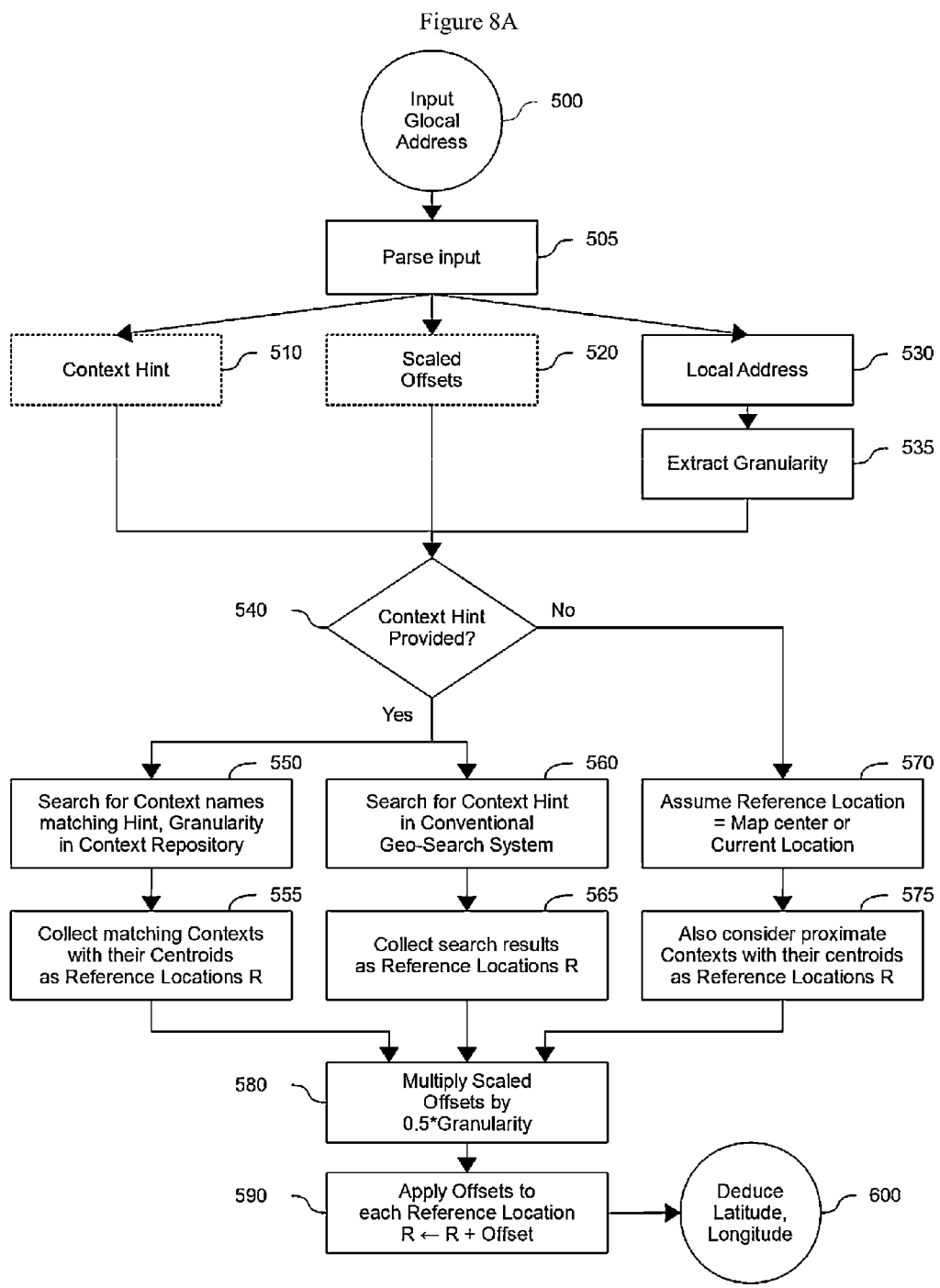
FIG. 8A shows a method of extracting latitude and longitude from the invention's location address.

Methods of Parsing Input Components and Handling Context Hints and Offsets:

FIG. 8A shows the first part of the invention's methods of extracting latitude, and longitude from previously computed Glocal address.

Step 500—Here the system is given a previously computed input Glocal address (FIG. 1A(5)) to interpret.

Step 505—The system parses the input, looking for the context hint (3), scaled offsets (2) and local address (1) parameters. This can be done in the parser software code or module (12)

Step 510—The system identifies the context hint (3) if is present.

Step 520—The system identifies the scaled offsets (2) if it is present.

Step 530—The system identifies the local address (1)

Step 535—Extract granularity from local address. In a preferred embodiment, the system algorithm logic assumes or has a preference for decimal degrees input. The system will generally assume that the number of symbols in the local address latitude parameter is the same as the number of symbols in the local address longitude parameter. In some embodiments, the system may further assume when the parameter is 4 characters long, and that this further represents a default granularity of 1°, and when the parameter is 3 characters long, this represents a default granularity 0.1°. These default values may be modified by the system settings and user preferences, however to further identify units, input format and Granularity as needed.

Step 540—The system may be configured so that that if the context hint is not provided then, the system will assume a reference location (see step 570). If a context hint is found, then the system will follow one or both paths shown in the steps starting at step 550 and step 560 below.

Step 550—The system will search for context names matching the hint, and granularity in the context repository (14)

Step 555—The system will collect matching contexts, in some embodiments using their centroids as reference Locations R, and then jump (Go To) step 580.

Step 560—The system will search for a context hint in one or more conventional Geo-Search systems (FIG. 3(32)). This can be done by the conventional Geo-Search delegator (FIG. 1B(18)).

Step 565—The system will collect search results as reference locations R, and then jump (Go To) Step 580.

Step 570—The system may be configured to assume that the reference location is the center or focus of an interactive digital map (FIG. 3(24)), current Location (FIG. 3(26)), or any other location based on the system settings/user preferences such as "Home City".

Step 575—Optionally, such as when there are no coordinate offsets, the system may also consider the proximate context repository entries with their centroids as being the reference locations R, and then jump (Go To) step 580.

Step 580—The system will then multiply the scaled offsets by 0.5*Granularity to get the (unscaled) offsets, thus ensuring the proper interpretation of positive and negative (signed) location data (here North and East are assumed to be positive, South and West are assumed to be negative).

Step 590—The system will apply (the unscaled) offsets to each reference location (i.e. apply an R←R+Offset) transformation.

Step 600—The system will then continue to part 2 of this process (shown in FIG. 8B) to deduce the latitude and longitude coordinate values.

FIG. 8B shows a method of extracting latitude and longitude coordinates from Glocal reference locations and the local address:

Step 600—Given one or more reference locations from Step 590, and the Glocal local address (1) from step 530, the invention's software implemented methods will then proceed as follows:

Step 610—The system will parse and decode the input data to extract the local digits of latitude and longitude. As previously discussed, the system may use its previously determined settings/and user preference parameters to disambiguate any ambiguous units and input formats.

Step 620—The system will then repeat the following steps for each reference location:

Step 630—The system will estimate the missing leading significant digits of the latitude and longitude coordinates. This step can be done in the coordinates calculator software code or module (FIG. 1B(16)). Assume use of decimal system data, one way to do this is as follows:

Based on granularity, the system will determine and appropriately place the decimal points on the local digits of each component The system will then multiply this result by the sign of the reference location coordinate, subtract result the result from the reference location coordinate, and then round off the results to the nearest Granularity. Thus, for example, if the granularity=1°, the longitude of the reference location=−114.9, and the local digits of the longitude are 1257 then we can determine that the reference longitude is: reference longitude is −114.9−sign(−114.9)* 0.1257=−114.7743; which, when rounded to the nearest integer is (−114.7743)=−115

This methodology tends to give the closest estimate, but other methods can also be used. Here for example, alternate methods can include simply truncating or rounding off the reference Location coordinate such that granularity is maintained.

Step 640—Fill in the trailing significant digits with the Glocal local digits to get a latitude, longitude pair "C".

Step 650—In some cases, the result "C" of step 640 may not always be the intended location (e.g. the reference location may not be close enough). In this case, we may optionally consider as, additional candidates, all adjacent combinations of latitude, longitude=C±Granularity Step 660—The method will sort these candidates based on the distance to the reference location R (with offset applied). Here, the method will give additional priority to those candidates that are located within the proximate context repository entries (from Step 555 or 575).

Step 670—The method will then present the nearest candidate as single result, and/or present a filtered subset of the candidates based on heuristic algorithms. Here, an important consideration for asymmetric contexts is whether a candidate location falls inside the context's polygon region. Here step 660 and step 670 can be done in the results presenter software module (FIG. 1B(11)).

Example Calculations

FIG. 9A shows examples of various Glocal address generation operations, showing the details of each step FIG. 9A example 1a uses the method's preferred settings, which are decimal degrees input format, Granularity=1°, Precision=0.0001°.

Example 1b uses an alternative setting. Here using degree decimal-minutes input format (DDD MM.MMM), with Granularity=10minutes, precision=0.001 minutes.

FIG. 9B shows additional examples of Glocal Address Generation, here showing less detail.

With regards to the 310 Washington St, Boston example: this address can be challenging for conventional geocoder software methods, as there are several such locations in the Boston area. Here however, by using the invention's Glocal method, each different location can have a separate local address within the Boston area.

With regards to the National Air and Space Museum, Washington, D.C. area example: here there are actually two such museums. In this situation, Glocal can be helpful in two ways:

1: HH01 versus IA44 distinguishes which part of town the museum is
2: Multiple entrances of the same museum can be specifically pointed to using Glocal With regards to the Ajanta Caves, India example: these caves contain famous frescos, and are a popular tourist attraction in a remote location in western India. The nearest town is Aurangabad, Maharashtra (104 km away) and the nearest major metro is Mumbai (formerly Bombay, airport code BOM). The invention's Glocal address approach is particularly useful because it gives a quick idea of the distance between the caves and these reference locations as well as the relative direction of the caves.

Other examples in FIG. 9B illustrate use of the invention's Glocal methods in all of the continents of the world.

FIG. 10 shows examples of how full latitude, longitude addresses can be extracted from Glocal address, along with the details of this extraction process.

FIG. 10 example 2a uses an explicit context and Granularity=1°. This is essentially the reverse of the calculation previously shown in FIG. 9 example 1a.

FIG. 10 example 2b uses an implicit context (center or focus of an interactive digital map) and Granularity=0.1°.

Additional uses of the invention's Glocal address representation methods can include use with more traditional printed maps, artificial landmarks such as billboards, electronic messages, eMarketing, and even verbal communications.

Here, for example, static maps (e.g. static digital maps or non-digital printed maps) can be annotated with Glocal local addresses, or part thereof, and with optional simple Glocal latitude encoding. Thus city or metro area maps can have Glocal encoded grid rows labeled AA, AB, AC etc. along with Glocal encoded columns labeled 33, 34, 35 and the like. The map grid tiles may be labeled with Glocal encoded labels such as A1, B1 . . . C3 and so on.

Further, artificial Landmarks (e.g. temporary displays such as banners, or more permanent displays such as billboards or structures) can also be annotated with Glocal address or parts of Glocal addresses. These displays can additionally include business information, such as local business advertisements, promotions, and so on.

Glocal position encoding methods can also be used in any electronic/digital data storage or communication, such as SMS/Instant/Text message, email, chat, status update, blog, web page, wiki, hyperlink, semantic web information, URL, query, Contact List/Address Book, Calendar, Business Card, Blu-Ray disk, DVD, CD, wireless communication, wired communication, and the like. Here the Glocal addresses may be used for searching, storing, transferring data with intent to represent location, and other activities.

Glocal position encoding methods can additionally be used in any human communication—verbal, written, and the like, to communicate location and related information.

Although, as previously discussed, almost any geodetic system can be used with Glocal, in a preferred embodiment, the latest revision of the World Geodetic System, currently WGS 84, will be used. It is also useful to combine the WGS 84 system with other easy to use Glocal parameters, such as unencoded simple (latitude number, longitude number) local format (170) and with easy to convert granularity parameters such as Granularity=1°. These settings enable Glocal address values to be better compatible with legacy maps, applications, devices and other systems which may not be Glocal enabled.

This is possible because the Glocal address is generally compatible with the lower significant digits of the legacy (latitude, longitude) system, but with the higher significant digits missing. Although the system will be generally used with computerized devices, as needed, the missing integers can also be manually determined as well. Here, for example, a traveler can get these higher significant digits from a GPS system, or alternatively ask a local resident for the digits, and insert them as a prefix to the other Glocal local address components. Here errors are easy to detect because mistaken higher order address prefix values will cause addresses to be off by at least ±1° (approx 100 km), which should generally be quite apparent.

The invention's Glocal system can also provide addresses with extra precision, as needed, as long as the Glocal parser software knows how this extra precision data is to be delimited. Here one convenient scheme is to use a decimal point, plus one extra digit, for 0.00001° (1 meter) precision. Thus higher precision Glocal addresses can look like (using San Francisco International Airport SFO symbol as an example), SFO 1234.1,5678.9 or SFO AB56/CD78. A9.

As previously discussed, the as long as a commonly understood convention is followed, the specific sequence of Glocal address components, separators or delimiter symbols (e.g. space, comma, /), prefixes ("-" before scaled offsets) used herein in the various examples are not critical. Many convenient alternative symbols may also be used. Here, however, it is generally prudent to choose symbols that avoid or minimize ambiguity and confusion.

In any electronic communication e.g. emails, SMS/Text messages, or in web pages, by using the invention's methods implemented in the form of software, a host system or computing device can automatically convert a Glocal Address to a hyperlink to a map, thus saving the user time and effort and reducing chance of error. This also provides an alternative to more tedious copy/pasting methods or forcing the user to enter numbers into map application.

Thus, for example, the message "Let's meet at 5678,1234" can be presented to the recipient as: "Let's meet at <a href='http://maps.xyz.com?q=28.5678,77.1234'>5678, 1234</a>".

Here, it may be useful to use a leading delimiter such as "@" or other distinguishing symbol to indicate a Glocal address. This delimiter would be particularly helpful with multi-word Context hints, such as "The meeting is @Bangalore, India ZZ58/ED09 tomorrow morning". Such a delimiter also could help third party parsers to identify Glocal addresses in documents (e.g. to recast as a link) or to extract Glocal addresses for other purposes (e.g. location information mining).

In a preferred embodiment, the symbols used in the Glocal addresses may be chosen to be amenable to URL addresses, as well as URL Shortening services. The default space delimiter can to URL encoded, as usual, to a plus (+) character in URLs e.g. http://x.x/SFO+AB12/CD34. This results in non-cryptic URLs with human friendly context hints. In alternative embodiments, however, a broader range of symbols, such as the entire printable ASCII character set, may also be used.

The invention's Glocal address methods and processes may also be exposed as web services, and used in conjunction with other input strings, such as "restaurants near SFO AB12/CD34"

As another application, the sub-part of a Glocal local address may be used to indicate region. Here, for example, "restaurants in SFO AB12/" would search for restaurants in the corresponding 0.01° square geographical region.

In other embodiments, the Glocal software may perform the Glocal conversion process dynamically while the user is entering in the input. This embodiment has the advantage that it both serves as a visual cue to enhance the user experience; and it also helps the user to detect typographical errors as the user enters the input data.

The Glocal system can also provide data mapping from Glocal address/es to postal address/es and/or business/resident names, either with or without existing reverse-geocoding. This may be provided either as web service or as offline data.

The Glocal system can also provide data mapping from Glocal address/es to other information such as user contact information (e.g. email, postal address, phone numbers, and the like). This may also be provided as a web service or as offline data.

Glocal Addresses may be stored and further integrated into operating systems (such as iPhone OS/iOS, Android, Windows Phone, Windows, MacOS, Linux) for seamless interaction with applications such as native mapping/navigation apps, contact manager, calendar, email, SMS/Text messaging, browser, as well as third party Location Based Services.

If there is sufficient information in the Glocal context repository (FIG. 1B(14)), the Glocal system may also operate on a stand-alone basis, without using information provided by a server (FIG. 3(30)) hosting a conventional geo-search system (FIG. 3(32)).

The Glocal system software, or parts thereof, can be located on many types of computerized devices, including client devices, server devices, and/or any intermediary computing device or network element.

Use for waypoints: GPS receiver assigned waypoints, and other waypoints, can also take advantage of the Invention's Glocal methods, often by using earlier assigned waypoints as a Glocal reference for later Glocal assigned waypoints.

Here for example assume N+1 waypoints are being assigned. Here, using the invention's Glocal methods, the previous Nth waypoint location can be used by the Glocal software as a reference location for the next (N+1)th waypoint Glocal local address. Thus the successive waypoint locations, in Glocal address format, can be of the type Chicago 1111,2222; 3333,4444; 5555,6666; or alternatively Chicago 1111,2222:3333,4444:5555,6666.

This type of method can be handy for multi-part directions, such as "proceed first to the main entrance of a large complex, and then to the appropriate parking lot or building entrance". In this Glocal format, this might be of the type: Napa 5101, 4787: Napa 5115,4808; which in turn may be written as any of the following: Napa 5101,4787:5115,4808; or Napa 5101, 4787:115,808; or Napa 5101,4787:15,08 (because latter location is within ±0.005° of former i.e. approx 0.5 km).

Alternatively, using interleaved local format encoding (previously discussed in FIG. 6A(185)), this might be: Napa EA47/ZA87:AE08.

This encoding scheme may also be enhanced, chosen, or altered to prevent occurrence of offensive words by replacing vowels by numbers, such as AEIOU=12345. This replacement may be done partially only to I and O to avoid confusion with the numbers 1 and 0, thus IO=34.

An alternative variation to this approach is to use this encoding to start from 360°, divide longitude coordinates into 10 parts (using 0 through 9) and then further divide this into 30 parts (0 through 29) resulting in 1.2° segments. Subsequently, logic similar to above (for 1°) can be used for 30*30*30 sub divisions finally resulting in 0.00004° precision, which is also generally quite acceptable accuracy for location and navigation.

The general concept of removing leading digits and using contexts with Asymmetric Proximity can also be useful in many other computing applications, such as to reduce data allocation and storage requirements. The quantities represented need not be just angles or coordinates. Indeed, this general concept can also be useful for altitude coordinates, as well as other dimensions such as time, mass, weight, and so on.

The following example shows how the invention's Glocal methods can also be used to designate a time quantity using mixed base 10 and non-base 10 values. Here [BC] Year Month Day, Hour:Minute:Second.Milliseconds; the input can be: Input=2011 May 6, 12:34:56.287; the granularity can be set to: Granularity=Year; and the precision can be set to: Precision=Minute. The output would then be of the form: Output=May 6, 12:35

Table Lookup or Database Search Methods:

In an alternative embodiment, an alternative Step (600) algorithm may be used to deduce Latitude and Longitude, and thereby achieve the same user experience. In this alternative embodiment, the Glocal Addresses are pre-calculated in part or full, and then saved in storage. These pre-calculated addresses can then be retrieved by a String/Text search.

For example, if the location 28.5859,77.0679 has a TEXT value "28.5859,77.0679" associated with it in computer memory storage (similar to conventional place name) then if a user searches for "5859,0679", the system can search for "%0.5859,%0.0679" (% representing wildcard) near the reference location or context (as conventional geo searches may already do) and get the coordinates 28.5859,77.0679 as a result. With a different encoding scheme, say if a global address is "abcdefgh" and input is "efgh" then the system can search using string operation 'endswith' and further select a result based on proximity to the reference location or context.

Other Alternative Embodiments

An alternative user interface and method, which reduces the need for a user to enter in the higher significant digits of an address of interest, may also be used. This alternative interface and method can automatically pre-fill parts of the address input field based on the system's knowledge of the user's current location or context e.g. "SFO$_{13\ 13\ 13\ 13\ 13\ 13}$". This is useful if an explicit context hint is desired, for any reason.

This approach is superior to alternative approaches, such as simply pre-filling the field with the higher digits of latitude and longitude (e.g. "37.$_{13\ 13\ 13\ 13\ 13\ 13}$,−122.$_{13\ 13\ 13\ 13\ 13\ 13}$"), because the intended location may have digits of Latitude or Longitude that are one degree higher or lower than the pre-filled value, thus making the results unreliable in many cases. By contrast the invention's Glocal methods are more robust in this regard.

An alternative to Steps 630 and 640 is to use the following formula for each of Latitude and Longitude:

Initial Candidate=sign(Reference Location)*

(Granularity*round((abs(Reference Location)−frac)/Granularity)+frac)

where "frac" represents the fractional value of Latitude or Longitude based on Granularity of input Local Address.

The Glocal Address parser (12) can also be configured to support a comment or general payload which is passed through to results. This feature can be used for postal purposes with the payload comprising information such as apartment number, suite number, floor number, person or business name or the entire postal address. Further, reverse-geocoding, if available, can be used to match the postal address.

Figure 11A:
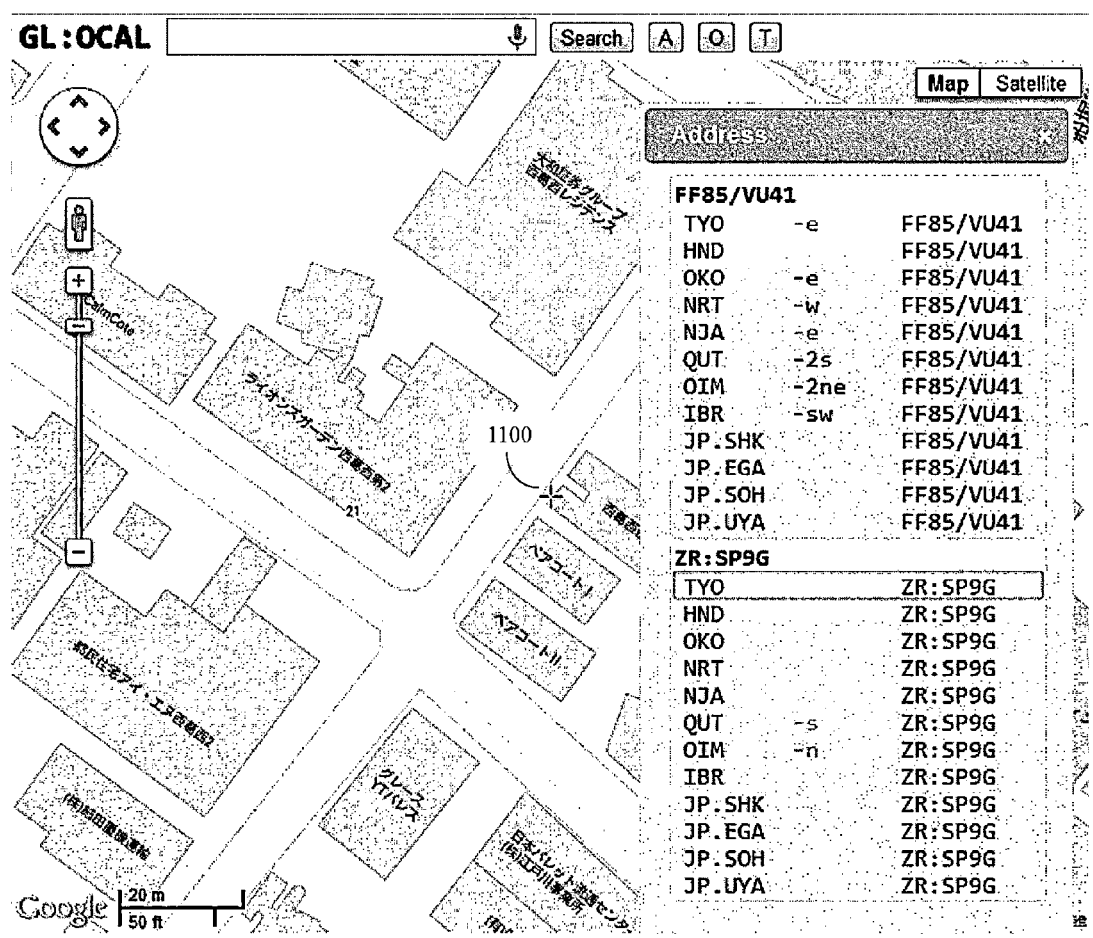
FIG. 11A shows an example of how the invention may be used for address location. Here the target address, Shanti Guest House in Tokyo, is shown in a larger map context. The Glocal Local Address, in 2 formats (encodings), and a number of alternative context hints are provided by the system (here a personal computer or tablet computer with a larger display resolution).
Figure 11B:
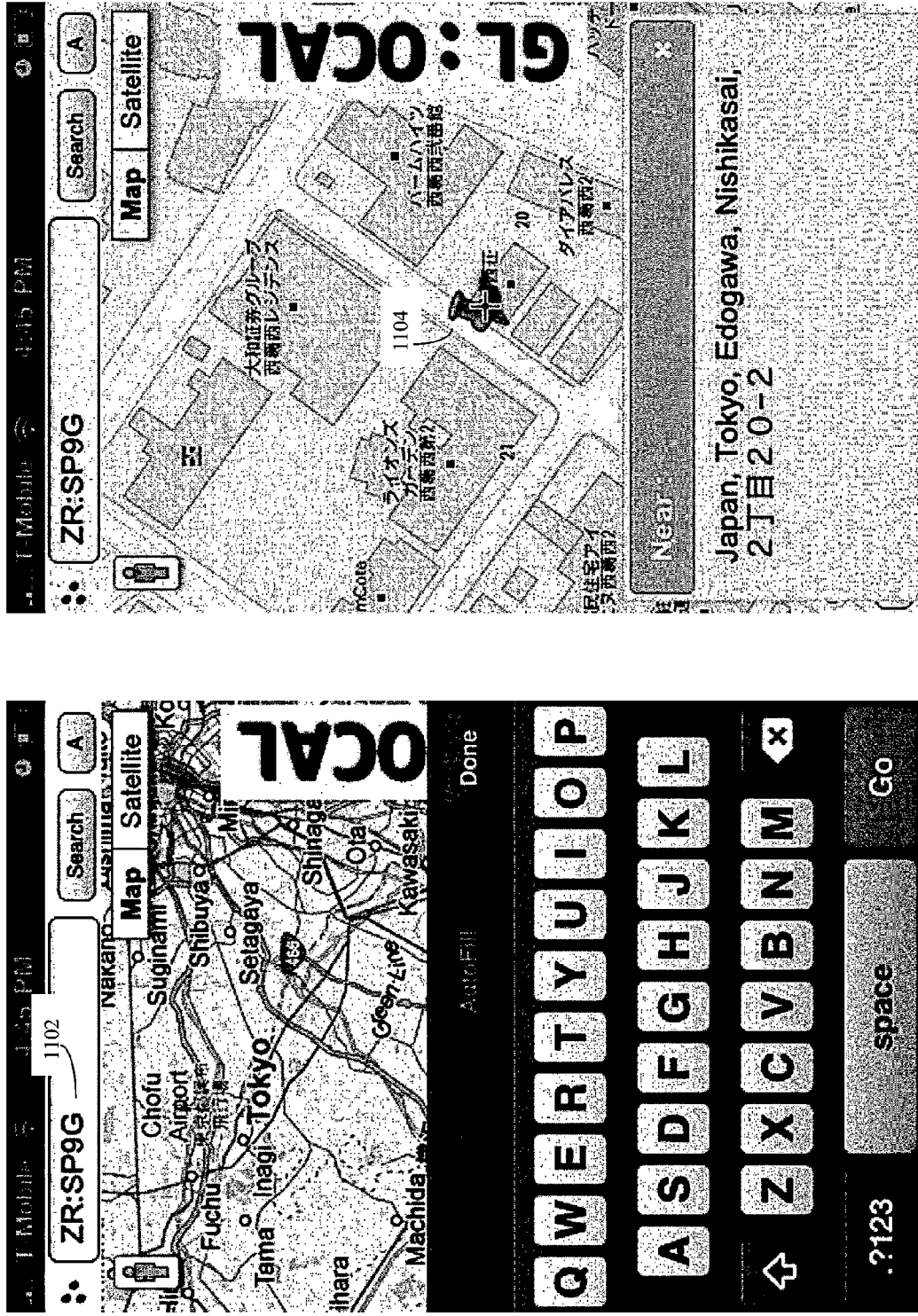
FIG. 11B shows the invention implemented on a smart phone with a smaller display resolution and configured to automatically use the phone's current GPS location to provide the context hint. Here the user, who is within the same large metro area, enters a Glocal local address formatted in base 30 with six digits and a colon separator, and the system in turn uses this data to pinpoint the target address on the map.
Figure 11C:
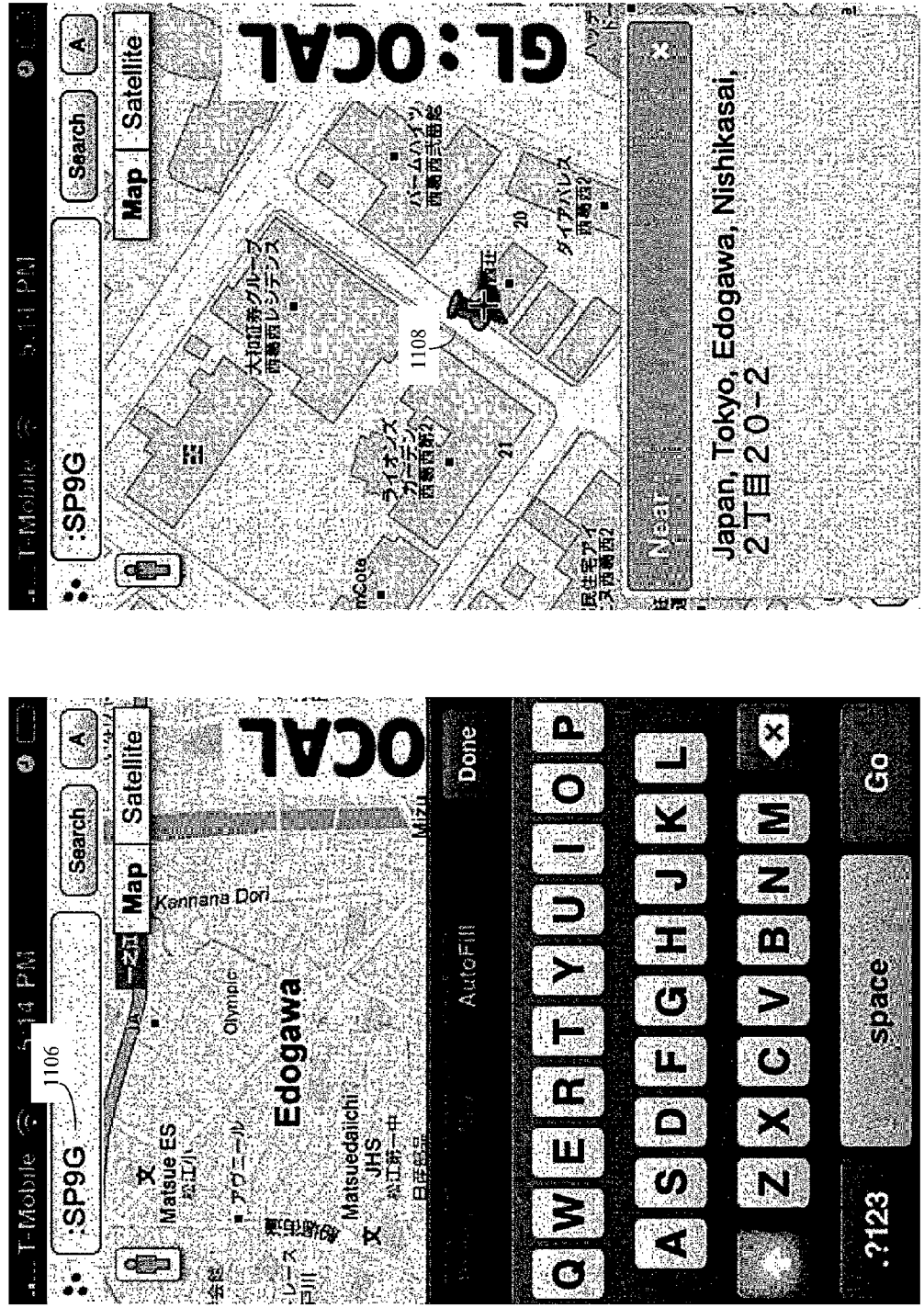
FIG. 11C shows an additional scenario in which the user is much closer to the target location. As a result, the user need only enter in a 4 digit Glocal address to pinpoint the target address on the map to the same level of accuracy.

Typical Use Case:

Screen shots in FIGS. 11A through 11C; illustrate common steps in a typical use case. In this use case, the previously discussed Tokyo Shanti Guest House address is again used as the example.

FIG. 11A shows an example of how the invention may be used for address location. Here the target address, Shanti Guest House in Tokyo, is shown in a larger map context. The Glocal Local Address, is shown in 2 alternative formats (encodings), and a number of alternative context hints are provided by the system (in FIG. 11A, the system may be a personal computer or tablet computer with a larger display resolution).

To begin with, the Glocal address for this Shanti Guest House location needs to be generated. Here a user may use the computerized system to zoom in and center the map at the desired Shanti Guest House location. The Glocal system in turn generates the location local address corresponding to the center of screen (marked by cross-hair), and in this example presents the results in two alternative formats. These are:
1) Decimal Granularity Based Latitude encoding (AB12/QR12) and
2) Base 30 encoded with Granularity=3° and colon separator (ab:cdef).

Additionally, several context hint options with appropriate scaled offsets are provided for each local address format. In this example, the context hints are represented by the IATA Airport codes followed by the UN Locodes (United Nations Code for Trade and Transport Locations), and these in turn are sorted by a combination of distance, importance and other heuristics.

In this example, different users are involved. For example, a first user, such as the manager of the manager of the Shanti Guest House hotel may do a Glocal lookup on a one time basis, and then publish the Local Address provided by the system (e.g. "ZR:SP9G") on the Shanti Guest House hotel website, contact info, business card etc. for later use by hotel customers (1100). This short local address would be sufficient for use all over the Tokyo metro area. Additionally, for non-local visitors one or more context hints provided by the system, such as "TYO", the airport code for Tokyo or "JP.EGA", the UN Locode for Edogawa, Japan may also be recommended. Of course, many visitors may prefer the more natural choice of "Tokyo" as a context hint.

Next, a smartphone user, who may be a potential Shanti Guest House hotel guest, and who is also located somewhere in Tokyo metro area will try to find the Shanti Guest House hotel. She can find the hotel by entering a 6 character Glocal Local Address (Base 30 encoded with colon separator "ZR:SP9G") into her smart phone. This is shown in FIG. 11B (1102), which shows the smartphone screen both before the search, and also successfully pinpointing the Shanti Guest House hotel target location after the search. Here, assuming that the smartphone is configured with its GPS location feature enabled, the system software can then automatically insert the context hint based in part on the smartphone's present GPS location.

As another example, consider another smartphone user, who may be a local Edogawa, Tokyo resident or local businessman, who wants to meet our guest from the previous example. Here, the user may be located within Edogawa, approximately 2 miles from the Shanti Guest House hotel. At this distance, this local businessman need only enter the last 4 characters of the 6 character version of Local Address (Base 30 encoded with colon separator, here "SP9G"). Here again, assuming that the smartphone's GPS location feature is enabled, the system software may be programmed to recognize that when only four characters are loaded, the granularity is smaller, and thus the software should automatically insert the higher order location values based in part on the smartphone's present GPS location. This is shown in FIG. 11C (1106), which shows the smartphone screen before the 4 character "SP9G" address search, and again successfully pinpointing the Shanti Guest House hotel target location after the search (1108). The system thus allows users to generally enter in the minimum amount of data as appropriate to the user's particular circumstance, and thus minimizes user typing and the chance of inadvertently generating typographical errors.

Techniques to Modify Encoding Schemes:

An alternative way to avoid ambiguity due to sign change near the equator and prime meridian is to transform Latitude and Longitude values to a range from 0 to 180 degrees and 0 to 360 degrees, respectively.

Closer to the poles, a unit difference in Latitude and Longitude does not correspond to the same distance. To adjust for this or for any other reason, Latitude and/or Longitude values may optionally be transformed by various linear or non-linear functions.

The inventions Glocal concepts may be also be applied with encodings that combine latitude and longitude e.g. a one character per resolution of coordinates instead of 2 characters e.g. twenty five letters of the English alphabet can be used to define a 5*5 grid as in the Table 4 below:

TABLE 4

One character per resolution encoding scheme

| A | B | C | D | E |
|---|---|---|---|---|
| F | G | H | I | J |
| K | L | M | N | O |
| P | Q | R | S | T |
| U | V | W | X | Y |

Since an important object of the invention is to increase the human usability of latitude and longitude determinations, market input can be an important factor at determining which of various schemes may be implemented. These market preferences, which may vary from region to region, may be used to determine which specific embodiments of the system may be implemented in a particular region.

The invention claimed is:

1. A computerized method of determining the complete latitude and longitude values of a geographic address, based on input data pertaining to said addresses' lower significant digit latitude and longitude values, and at least one context hint pertaining to the addresses' higher significant digit latitude and longitude values, said method comprising:
   obtaining an encoded version of said addresses' lower significant digit latitude and longitude values;
   obtaining or determining a latitude and longitude granularity value;
   obtaining at least one context hint; wherein said at least one context hint is related to said higher significant digit latitude and longitude values of said address within the error limits defined by said granularity value;
   using at least one computerized device comprising at least one processor, memory, and software, and said at least one context hint, to determine the higher significant digits of the latitude and longitude associated with said at least one context hint;
   using said at least one computerized device to parse or decode said encoded lower significant digit latitude and longitude values, thereby producing decoded lower significant digit latitude and longitude values;
   combining said decoded lower significant digit latitude and longitude values with said higher significant digit latitude and longitude values associated with said context hint, thereby determining a complete address with both higher significant and lower significant latitude and longitude values.

2. The method of claim 1, wherein said encoded version of said addresses' lower significant digit latitude and longitude values maps said values onto a base encoding scheme between or equal to a base 10 to base 128 base encoding scheme, said encoding scheme further using symbols selected from the printable set of ASCII characters.

3. The method of claim 2, wherein said encoding further uses different character maps or separators to indicate granularity, or interleaves said latitude and longitude symbols thus producing an encoding scheme where the encoded prefix comprises larger geographic areas, and the encoded suffix of comprises a smaller geographic area at a defined location within said larger geographic areas.

4. The method of claim 1, wherein said granularity value is equal to or between 0.1 degree and 4 degrees of latitude and equal to or between 0.1 degrees and 4 degrees of longitude;
   and wherein said granularity is either equal or different between said latitude and longitude, and wherein said granularity is either scaled by a linear scaling function or a non-linear scaling function.

5. The method of claim 1, wherein said granularity value is obtained from the memory of said at least one computerized device; or
   wherein said input data has a format, and determining said granularity value from said input data format.

6. The method of claim 1, further obtaining a scaled offset value, and using said scaled offset value to alter the higher significant digits of the latitude and longitude associated with said at least one context hint;
   and using said altered higher significant digits of the latitude and longitude associated with said at least one context hint for determining said complete address.

7. The method of claim 6, wherein said scaled offset value is used in cases where said address is within the granularity value of the equator or prime meridian.

8. The method of claim 1, wherein said context hint is derived from either GPS location, GeoLocation result, center or focus of interactive map, IP address location, telephone number, last known address, location in user profile, or other geographic location parameter communicated from or stored in the memory of said at least one computerized device.

9. The method of claim 1, wherein said context hint is derived from a standard human recognizable place location with a known latitude and longitude value within error limits defined by said granularity value;
further searching a geo-search database on an external server, or a context repository stored on said computerized device for said standard human recognizable place location and determining said known latitude and longitude value.

10. The method of claim 1, wherein said encoded version of said addresses' lower significant digit latitude and longitude values are further generated by the steps of:
obtaining a geographic address;
determining the latitude and longitude of said geographic address;
obtaining a granularity value;
obtaining a precision value;
using said granularity value to truncate the higher significant digits of the latitude and longitude of said geographic address, producing a remainder latitude and longitude of said geographic address;
using said precision value to truncate or round-off the least significant digits of said remainder latitude and longitude of said geographic address, producing lower significant digits of the latitude and longitude of said geographic address; and
encoding said lower significant digits of the latitude and longitude of said geographic address.

11. The method of claim 10, wherein said encoding maps said values onto a base encoding scheme between or equal to a base 10 to base 128 base encoding scheme, said encoding scheme further using symbols selected from the printable set of ASCII characters.

12. The method of claim 10, wherein said encoding further uses different character maps or separators to indicate granularity, or interleaves said latitude and longitude symbols thus producing an encoding scheme where the encoded prefix comprises larger geographic areas, and the encoded suffix of comprises a smaller geographic area at a defined location within said larger geographic areas.

13. The method of claim 10, further providing said context hints by:
searching a geo-search database or a context repository for a list of human recognizable place locations at distances from said geographic address that occur within the distance error limits defined by said granularity value; and
outputting said human recognizable place location as a context hint.

14. The method of claim 10, further providing a scaled offset value by determining if the distance between the higher significant digits of the latitude and longitude of said context hint and said geographic address is greater than the distance represented by half of said granularity value;
and if so further generating a scaled offset value that, when applied to the higher significant digits of the latitude and longitude of said context hint, produces an adjusted context hint with a distance between the adjusted context hint and the geographic address that is less than the distance represented by half of said granularity value.

15. A computerized method of generating an encoded version of the lower significant digits of a geographic addresses' latitude and longitude values, said method comprising:
obtaining a geographic address;
determining the latitude and longitude of said geographic address;
determining or obtaining a granularity value;
using a computerized device comprising at least one processor, memory, and software to use said granularity value to truncate the higher significant digits of the latitude and longitude of said geographic address, producing lower significant digits of the latitude and longitude of said geographic address; and
encoding said lower significant digits of the latitude and longitude of said geographic address.

16. The method of claim 15, wherein said encoding maps said values onto a base encoding scheme between or equal to a base 10 to base 128 base encoding scheme, said encoding scheme further using symbols selected from the printable set of ASCII characters.

17. The method of claim 15, wherein said encoding further uses different character maps or separators to indicate granularity, or and interleaves said latitude and longitude symbols thus producing an encoding scheme where the encoded prefix comprises larger geographic areas, and the encoded suffix of comprises a smaller geographic area at a defined location within said larger geographic areas.

18. The method of claim 15, further providing said context hint by:
searching a geo-search database on an external server or a context repository for a human recognizable place location with a latitude and longitude with higher significant digits that correspond to the higher significant digits of the truncated higher significant digits of the latitude and longitude of said geographic address; and
outputting said human recognizable place location as a context hint.

19. The method of claim 15, further providing a scaled offset value by determining if the distance between the higher significant digits of the latitude and longitude of said context hint and said geographic address is greater than the distance represented by half of said granularity value;
and if so further generating a scaled offset value that, when applied to the higher significant digits of the latitude and longitude of said context hint, produces an adjusted context hint with a distance between the adjusted context hint and the geographic address that is less than the distance represented by half of said granularity value.

* * * * *